United States Patent

Fukawa et al.

[11] Patent Number: 6,128,332
[45] Date of Patent: Oct. 3, 2000

[54] SPREAD SPECTRUM TRANSMITTER AND RECEIVER EMPLOYING COMPOSITE SPREADING CODES

[75] Inventors: Kazuhiko Fukawa, Yokohama; Hiroshi Suzuki, Yokosuka, both of Japan

[73] Assignee: NTT Mobile Communications Network Inc., Tokyo, Japan

[21] Appl. No.: 08/990,286

[22] Filed: Dec. 15, 1997

Related U.S. Application Data

[62] Division of application No. 08/658,123, Jun. 4, 1996, Pat. No. 5,790,588.

[30] Foreign Application Priority Data

Jun. 7, 1995 [JP] Japan ..................... 7-140542

[51] Int. Cl.[7] .................. H04B 1/707; H04J 13/04
[52] U.S. Cl. .......................... 375/146; 370/342
[58] Field of Search ............... 370/342; 375/130, 375/135, 138, 140, 141, 146

[56] References Cited

U.S. PATENT DOCUMENTS

| | | | |
|---|---|---|---|
| 4,969,159 | 11/1990 | Belcher et al. | 375/207 |
| 5,420,850 | 5/1995 | Umeda et al. | 370/342 |
| 5,511,068 | 4/1996 | Sato | 370/335 |
| 5,623,487 | 4/1997 | Natali | 370/342 |
| 5,623,511 | 4/1997 | Bar-David et al. | 375/207 |
| 5,862,172 | 1/1999 | Sugita et al. | 375/200 |
| 5,956,328 | 9/1999 | Sato | 370/335 |
| 5,956,368 | 9/1999 | Jamal et al. | 375/206 |

FOREIGN PATENT DOCUMENTS

0632611A2  1/1995  European Pat. Off. .

OTHER PUBLICATIONS

European Search Report.

*Primary Examiner*—Young T. Tse
*Attorney, Agent, or Firm*—Pollock, Vande Sande & Amernick

[57] ABSTRACT

In a system with a spread spectrum transmitter and receiver employing composite spreading codes, the transmitter spreads, in a spreading part, a baseband modulated signal by a short code from a short code generator and a long code from a long code generator with a longer chip period than that of the short code and then transmits the spread baseband modulated signal. The receiver despreads a spread baseband received signal in a receiving part by a pair of short and long codes in one despreading part to obtain a baseband modulated signal of a direct path and despreads the spread baseband received signal by the pair of short and long codes delayed by a multipath delay time difference in the other despreading part to obtain a baseband modulated signal of a delayed path, and the baseband modulated signals thus obtained are diversity-detected to obtain a detected baseband signal.

5 Claims, 18 Drawing Sheets

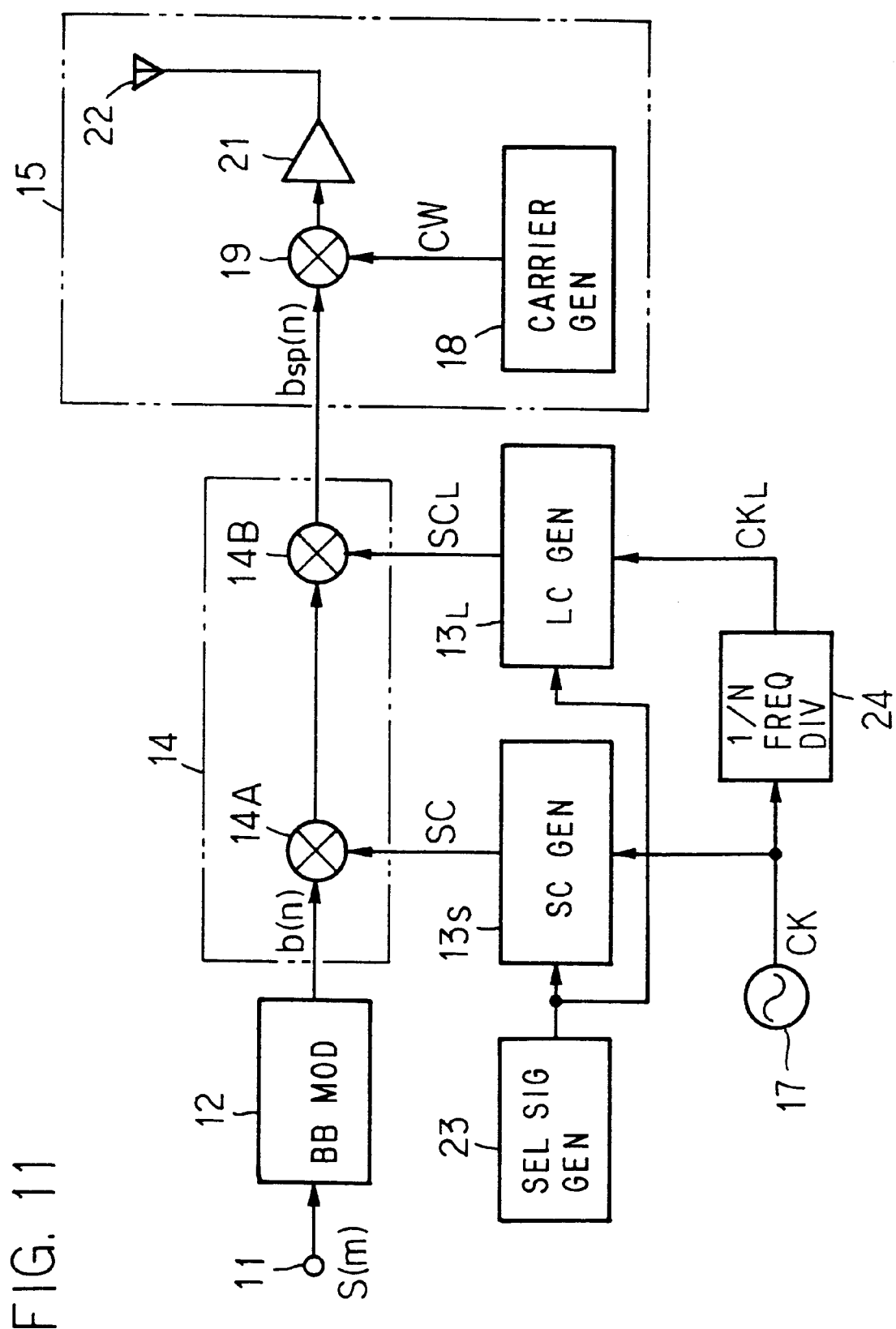

SPREAD SPECTRUM TRANSMITTER AND RECEIVER EMPLOYING COMPOSITE SPREADING CODES

CROSS REFERENCE TO RELATED APPLICATIONS

This application is a divisional of U.S. patent application Ser. No. 08/658,123, filed Jun. 4, 1996, now U.S. Pat. No. 5,790,588, issued Aug. 4, 1998.

BACKGROUND OF THE INVENTION

The present invention relates to a direct sequence code division multiple access system in spread spectrum communications and, more particularly, to a spread spectrum receiver and transmitter that spreads an input signal by both short-term and long-term spreading codes (hereinafter referred to as short and long codes, respectively).

In recent years, a variety of spread spectrum systems have been studied for more effective frequency utilization in digital mobile radio communications (M. K. Simon, J. K. Omura, R. A. Scholtz and B. K. Levitt, "Spread Spectrum Communication", Computer Science Press, 1985). In particular, a DS-CDMA (Direct Sequence-Code Division Multiple Access) system is relatively simple in configuration and studies have been continued with the goal of putting it to practical use. In the application of the DS-CDMA system to, for example, a cellular mobile radio communication system, the same short code can be used in adjacent cells when different long codes are assigned to them.

In FIG. 1 there is illustrated a prior art example of a transmitter in the DS-CDMA system. A digital signal s(m) is fed via an input terminal 11 to a baseband modulator 12, which uses the digital signal s(m) to generate a baseband modulated signal b(n). The baseband modulated signal b(n) is applied to a multiplier 14A forming a spreading part 14, wherein it is spectrum-spread by being multiplied by a short code $SC_S$ that is fed from a short code generator $13_S$. The multiplied output is further fed to another multiplier 14B forming the spreading part 14, wherein it is again spectrum-spread by being multiplied by a long code $SC_L$ from a long code generator $13_L$. The chip periods of the short and long codes $SC_S$ and $SC_L$ are both $T_C$, and the short and long code generators $13_S$ and $13_L$ operate on a clock signal CK of a clock frequency $1/T_C$ which is generated by a clock signal generator 17. A baseband modulated signal $b_{sp}(n)$, which is the output from the multiplier 14B, is applied to a multiplier 19, wherein it is up-converted to the RF frequency band by being multiplied by a carrier signal CW from a carrier signal generator 18, and the multiplier output is amplified by a transmitting amplifier 21, thereafter being sent as a transmitting modulated wave from an antenna 22.

The short code $SC_S$ has a code period of the same length as that of the symbol period $T_S$ of the baseband modulated signal b(n) as shown in FIG. 2 and spectrum-spreads respective symbols b(1), b(2), . . . . On the other hand, the long code $SC_L$ has a very long period $T_L$ corresponding to tens or hundreds of symbol length and is used to randomize signals received from other cells (or zones). The long code is usually a long-term PN (Pseudo Noise) sequence, and the same cell is assigned the same long code and different cells different long codes. Since different long codes have very low correlation, they can be used to randomize received signals from other cells. The short code generator $13_S$ has, for example, a well-known configuration which EXCLUSIVE ORs outputs from at least two desired shift stages of a shift register and feeds the result of the exclusive ORing back to the input of the shift register. Letting the number of shift stages of the shift register be represented by K, a ($2^K-1$)-chip pseudo noise code (PN code) which repeats itself with a ($2^K-1$)$T_C$ period can be generated by driving the shift register with a clock signal of a $1/T_C$-chip rate. The long code generator $13_L$ can be identical in construction with the short code generator $13_S$, except that the number of shift stages K is sufficiently larger than that in the latter.

In FIG. 3 there is shown in block form a prior art example of a receiver in the DS-CDMA system. Incidentally, the propagation is assumed to be a two-path Rayleigh fading model and, therefore, its operation will be described on the assumption that the received wave is based on a two-wave model consisting of a direct path and a delayed path. In the first place, the received wave arrives at an antenna 25. The received wave is amplified by a low-noise amplifier 26 and multiplied in a multiplier 28 by a carrier signal CW from a carrier signal generator 27, thereafter being fed to a low-pass filter 29. This operation or manipulation corresponds to down-converting, and the low-pass filter 29 outputs the spread-spectrum baseband modulated signal $b_{sp}(n)$, which is applied to an input terminal $3_{IN}$ of a multipath separating part 30. The spread-spectrum baseband modulated signal $b_{sp}(n)$ is branched by a hybrid circuit 31 to two paths corresponding to the two propagation paths and input into despreading parts $32_1$ and $32_2$. A multiplier $32A_1$ forming the despreading part $32_1$, multiples the spread baseband modulated signal $b_{sp}(n)$ by a short code $SC_S$ from a short code generator $33_S$ and provides the multiplied output to another multiplier $32B_1$ forming the despreading part $32_1$. The multiplier $32B_1$ further multiplies the input by a long code $SC_L$ from a long code generator $33_L$ and provides the multiplied output to an integrator $35_1$, which accumulates the latest multiplied results of the same number as the chip number of the short code. In other words, the integrator $35_1$ acts just like a low-pass filter that outputs a mean value of a predetermined number of multiplied outputs. These operations corresponds to despreading. These spreading codes $SC_S$ and $SC_L$ have a high auto-correlation and no desired signal can be extracted without coincidence of their timing in transmission and reception. The short code generator $33_S$ and the long code generator $33_L$ are driven by a clock signal CK of a clock frequency $1/T_C$ which is generated by a clock signal generator 39.

Assuming that the spreading codes $SC_S$ and $SC_L$ of the direct path coincide in timing with the spreading codes $SC_S$ and $SC_L$ produced by the short code generator $33_S$ and the long code generator $33_L$, the integrator $35_1$ extracts a path component of the direct path, which is provided as a despread baseband modulated signal $b_1(n)$ to a terminal $3_1$. Similarly, a multiplier $32A_2$ forming the despreading part $32_2$ multiplies the spread baseband modulated signal $b_{sp}(n)$ by a delayed short code $SC_S$ from a delay circuit $36_S$ and provides the multiplied output to another multiplier $32B_2$ forming the despreading part $32_2$. The multiplier $32B_2$ further multiplies the input multiplied output by a delayed long code from a delay circuit $36_L$ and provides the multiplied output to an integrator $35_2$, which provides a despread baseband modulated signal $b_2(n)$ to a terminal $3_2$. These operations correspond to despreading. When the spreading timing in the received delayed path of the short and long codes coincides with the timing of the delayed short and long codes $SC_S$ and $SC_L$, a path component of the delayed path is extracted by the integrator $35_2$ and provided as the despread baseband modulated signal $b_2(n)$ to the terminal $3_2$ of the multipath separating part 30.

The hybrid circuit 31, the spreading parts $32_1$ and $32_2$, the integrators $35_1$ and $35_2$, the delay circuits $36_S$ and $36_L$, the short code generator $33_S$ and the long code generator $33_L$ constitute the multipath separating part 30. A diversity type detecting part 40 inputs thereinto despread baseband modulated signal $b_1(n)$ and $b_2(n)$ for the respective propagation paths, provided from the integrators $35_1$ and $35_2$, then performs diversity detection and outputs the resulting digital signal s(m) to a terminal 41. A possible configuration of the diversity type detecting part 40 is one that combines input signals after differential detection and makes a hard decision.

The above receiver randomizes signals from other users using different short codes in the same cell wherein users share the long code $SC_L$, that is, randomizes interference signals, besides it randomizes multipath components of a desired signal delayed by different time intervals. These randomized signals are added as noise to the despread baseband modulated signals $b_1(n)$ and $b_2(n)$, leading to an increase in the total amount of noise power. If the interference signal components could be canceled from the despread baseband modulated signal by providing the diversity type detecting part 40 with an interference canceling capability, an improved transmission characteristic could be obtained by suppressing the above-mentioned increase in the total amount of noise power. Since the long code has a high auto-correlation, however, multipath components are randomized by the long code when they are delayed even by one chip relative to signals from other users in the same cell assigned the same long code and a signal of a desired signal; hence, these signal components cannot be canceled by the interference canceler.

As another example of the DS-CDMA system that employs the short and long codes, see, for example, U.S. Pat. No. 4,969,159, that uses short and long codes of different chip rates. This is based on the premise that the receiver performs despreading by the short code through the use of a SAW filter. Since the scale of the SAW filter increases with the period length of the short code, it is customary in the art to cut the period length of the short code used to ⅛ the data bit period so as to decrease the scale of the SAW filter and reduce power consumption. At the same time, a long code of a period (15/8 times) longer than the data bit period is used to acquire a large spreading gain. In this system, the period of the long code is 15 times longer than the period of the short code and the chip period of the long code is set at 127 times the chip period of the short code. Since in this system the period of the long code is about twice the data bit period and the chip number of the long code is 15, appreciably smaller than the chip number 127 of the short code, the effect of randomization by the long code is lessened. Therefore, different pairs of long and short codes of low cross correlation cannot be selected in numbers for each cell.

SUMMARY OF THE INVENTION

It is a first object of the present invention to provide a spread spectrum transmitter and receiver employing composite spreading codes to permit effective utilization of the multi-path received energy in the receiver and hence improve the bit error rate.

A second object of the present invention is to provide a spread spectrum transmitter and receiver employing composite spreading codes which attain the above-mentioned first object and keep spectral bandwidth of transmission waves with baseband signals of different transmission rates constant.

A third object of the present invention is to provide a spread spectrum receiver employing composite spreading codes which attains the above-mentioned first object and is capable of canceling interference signals from other users.

A fourth object of the present invention is to provide a spread spectrum receiver employing composite spreading codes which attains the above-mentioned first object and is robust against fading.

According to a first aspect of the present invention, the spread spectrum transmitter of the above-mentioned first object is implemented by a configuration in which a baseband modulated signal is spread by a short code and a long code with a longer chip period to obtain a spread baseband modulated signal and a carrier signal is modulated by the spread baseband modulated signal in the transmitting part for transmission.

According to a second aspect of the present invention, the above-mentioned second object is attained by the spread spectrum transmitter of the first aspect which has a configuration in which the chip number of the short code by the short code generator is made variable depending on the transmission rate of the baseband modulated signal so that the code period coincides with the symbol period without changing the chip period of the short code.

According to a third aspect of the present invention, the spread spectrum transmitter of the above-mentioned second object is implemented by a configuration in which: a demultiplexer, a plurality of modulators and a plurality of spreading parts are provided; an input signal is demultiplexed by the demultiplexer into one or more signal sequences with predetermined transmission rates; the signal sequences are spread by pairs of different short codes and a common long code in spreading parts respectively corresponding to the signal sequences to generate spread baseband modulated signals; the thus obtained spread baseband modulated signals are added together by an adder into a composite signal for transmission from the transmitting part.

According to a fourth aspect of the present invention, the receiver of the above-mentioned object is implemented by a configuration in which: a spread baseband received signal is derived from the received wave in the receiving part; the spread baseband received signal is despread by a pair of a short code and a long code with a larger chip number in each of the despreading parts, provided, respectively, and corresponding to a predetermined number of multipaths, at the timing corresponding to one of the multipaths in synchronization with a first clock signal and a second clock signal of a period N times longer than that of the former, thereby obtaining a despread signal corresponding to one of the multipaths; and such despread signals are diversity-detected in a diversity detecting part to obtain a detected digital signal.

According to a fifth aspect of the present invention, the above-mentioned second object is attained by the receiver of the fourth aspect which has a configuration in which the chip number of the short code by the short code generator is made variable depending on the transmission rate of the baseband modulated signal so that the code period coincides with the symbol period without changing the chip period of the short code.

According to a sixth aspect of the present invention, the spread spectrum receiver of the above-mentioned second object is implemented by a configuration in which the spread baseband received signal from the receiving part is despread in a plurality of multipath separating parts corresponding to multipath components by pairs of short codes different and a common long code to obtain baseband modulated signal of the multipath components; the thus obtained baseband modulated signals are diversity-detected in a plurality of diversity detecting parts to obtain detected digital signals; and the outputs from the diversity detecting parts are sequentially selected by a multiplexer in correspondence with the transmission rates to obtain a single sequence of detected digital signals.

According to a seventh aspect of the present invention, the second spectrum receiver of the above-mentioned third object is attained by the receivers of the fourth, fifth and sixth aspect which have a configuration in which each diversity detecting part has an interference canceler for each multipath component to cancel interference signals from other users.

According to an eighth aspect of the present invention, the spread spectrum receiver of the above-mentioned fourth object is implemented by a configuration in which: a plurality of receiving parts each having an antenna are provided; spread baseband received signals from the receiving parts are despread for each multipath component by pairs of short and long codes to obtain baseband modulated signals; and the thus obtained baseband signals are diversity-detected in diversity detecting parts to obtain detected digital signals.

BRIEF DESCRIPTION OF THE DRAWINGS

FIG. 11 is a block diagram illustrating an embodiment of the transmitter of the present invention which has a configuration capable of dealing with different transmission rates;

DESCRIPTION OF THE PREFERRED EMBODIMENTS

Figure 1:
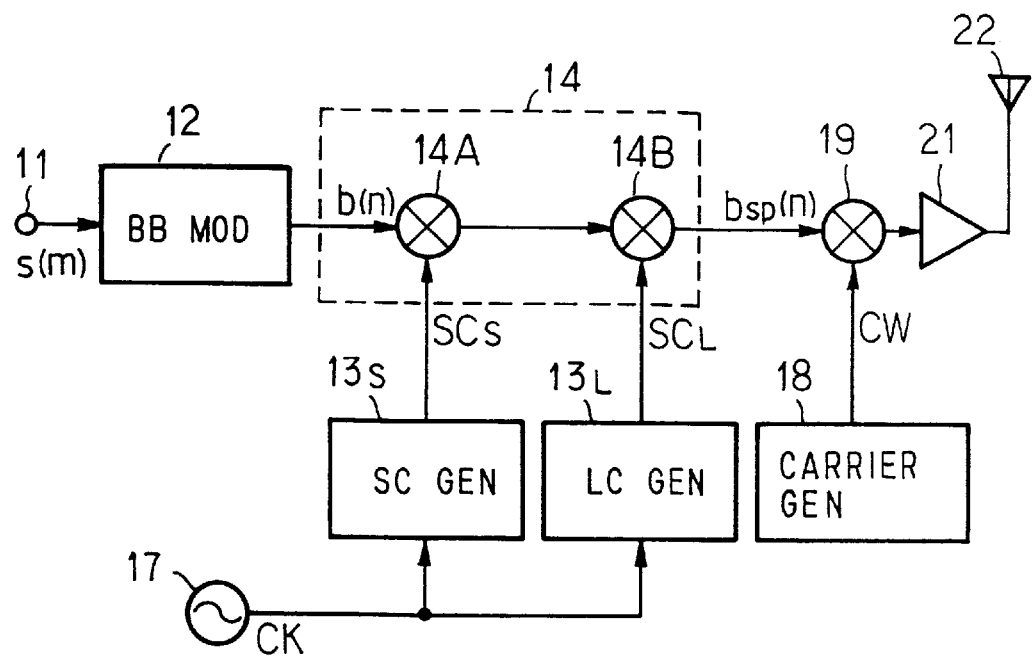
FIG. 1 is a block diagram of a conventional DS-CDMA transmitter.
Figure 2:
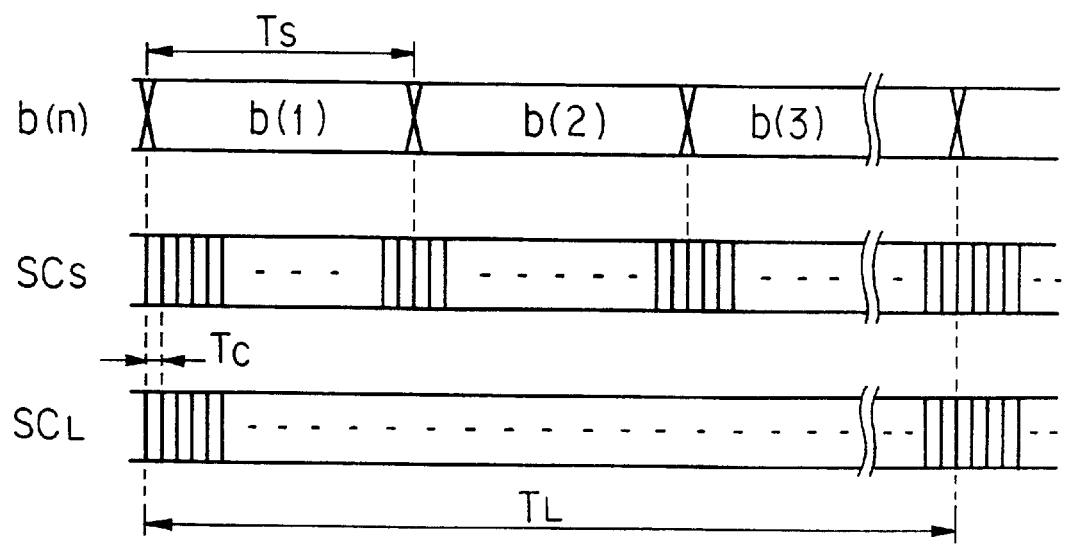
FIG. 2 is a timing chart showing the timing relations between the symbol length of a baseband modulated signal and short and long codes.
Figure 4:
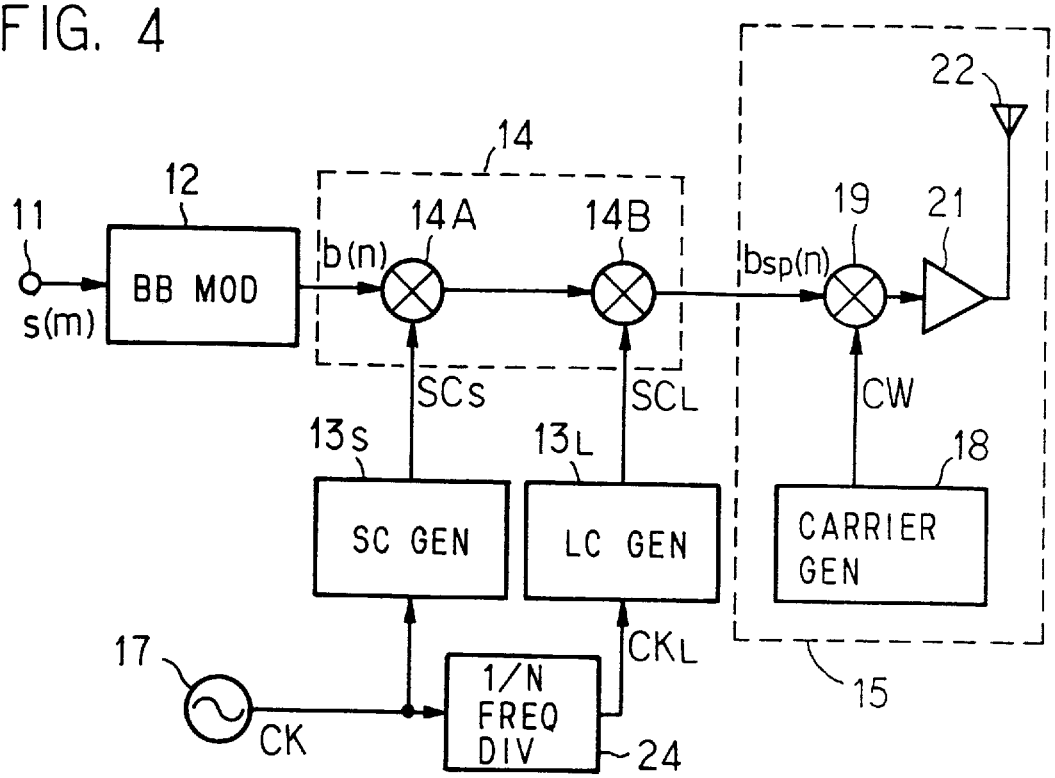
FIG. 4 is a block diagram illustrating an embodiment of the DS-CDMA transmitter according to the present invention.

In FIG. 4 there is illustrated in block form an embodiment of the spread spectrum transmitter according to the present invention, in which the parts corresponding to those in FIG. 1 are identified by the same reference numerals. The digital signal s(m) is fed via the input terminal 11 into the transmitter, wherein the baseband modulator 12 uses the digital signal s(m) to generate the baseband modulated signal b(n). The baseband modulated signal b(n) is applied to the multiplier 14A of the spreading part 14, wherein it is spectrum-spread through its multiplication by the short code $SC_S$ from the short code generator $13_S$. The multiplied output is provided to the multiplier 14B of the spreading part 14, wherein it is further spectrum-spread by the long code $SC_L$ from the long code generator $13_L$. The short code generator operates on the clock signal CK of the clock frequency $1/T_C$ which is generated by the clock signal generator 17, and the chip period of the short code $SC_S$ is $T_C$.

Figure 5:
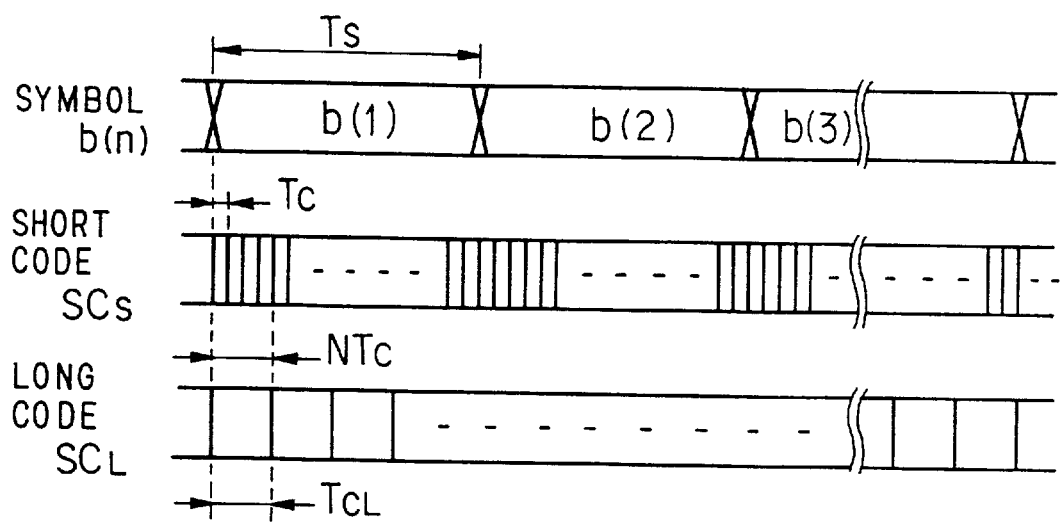
FIG. 5 is a timing chart showing the timing relations between the symbol length of a baseband modulated signal and short and long codes in the present invention.

As described previously in respect of FIG. 1, each symbol of the baseband modulated signal b(n) is multiplied in the multiplier 14A by the short code $SC_S$ of the period $T_S$ over the entire length thereof as shown in FIG. 5. Unlike in the prior art example of FIG. 1, the long code generator 13L is driven by a frequency-divided clock signal (of a clock frequency $1/(NT_C)$, where N is an integer equal to or greater than 2) obtained by frequency-dividing the clock signal of the clock frequency $1/T_C$ from the clock signal generator 17 by a frequency divider 24 down to 1/N. Accordingly, the chip period $T_{CL}$ of the long code $SC_L$ is $NT_C$, which is longer than the chip period of the short code $SC_S$. With such an extended chip period $T_{CL}$ of the long code, the auto-correlation of the long code becomes loose; namely, even if two identical long codes are relatively shifted by several chips of the short code (smaller than N), a relatively high correlation can be obtained. In particular, when the chip period $NT_C$ of the long code is set longer than the delay times of some typical delayed paths relative to the direct path in the propagation path, multipath components of different delay times contained in the despread baseband modulated signal, obtained by despreading the received signal in the receiver, are not sufficiently randomized by despreading with the long code. That is to say, a correlation between the multipath components of different delay times increases and these multipath components can effectively be utilized as desired signal component energy by diversity detection.

In the actual mobile radio communication system, delay times of delayed paths received at levels nonnegligible relative to that of the direct path (the delay time range for the path delayed behind the direct path) may be set at a maximum of 3 μsec or so in urban areas and a maximum of 50 μsec in mountainous areas. Accordingly, the delay time difference to be taken into account in the system ranges from 3 to 50 μsec, and it is sufficient to suitably select the chip period $T_{CL}=NT_C$ of the long code in the range from 3 to 50 μsec. In practice, when the chip period $T_{CL}$ of the long code is longer than 10 μsec, the acquisition of synchronization for despreading by the long code in the receiver consumes too much time and, therefore, the chip period $T_{CL}$ may preferably be set at about 3 μsec, taking into consideration the maximum delay time in urban areas. The value N changes depending upon how the chip period $T_C$ of the short code is selected. For example, assuming that the short code has a chip number of 127 and a 1-μsec chip period $T_C$, the long code a 3-μsec chip period $T_{CL}=N_{TC}$ and the transmission signal a 127-μsec symbol period, N=3.

Since in the above the present invention has been described as being applied to the case where the frequency divider 24 is used to obtain the long-code chip period $T_{CL}$ longer than the short-code chip period $T_C$, the value N has been described to be an integer equal to or greater than 2, but the principle of the invention is based on the fact that the long-code chip period $T_{CL}$ is longer than the short-code chip period $T_C$, so the value N is not limited specifically to an integer but needs only to be larger than 1. When the value N is not an integer, the frequency divider 24 can be formed by, for example, a multiplier and a frequency divider circuit or demultiplier. Setting j<k where j is an integer equal to or greater than 2 and k an integer equal to or greater than 3, the frequency divider 24 in the case of N=k/j can be constituted, for instance, by multiplying the frequency of the clock signal CK with the multiplier to j times and then dividing it by a 1/k-frequency divider circuit down to 1/k. Since no multiplier is required when the value N is an integer, the system configuration could be simplified accordingly. Alternatively, the clock frequency of the clock signal generator 17 is set at j times higher than in the above-described embodiment and a 1/j-frequency divider circuit and a 1/k-frequency divider circuit are provided in the frequency divider 24. In this instance, the output obtained by frequency-dividing the clock signal from the clock signal generator 17 down to 1/j is applied as the clock signal to the short code generator $13_S$, and the output obtained by frequency-dividing the clock signal down to 1/k is applied as the clock signal to the long code generator $13_L$. It is preferable that the value N is large, but as the value N increases, the time of one period of the long code becomes longer and the time for the acquisition of synchronization also becomes longer; hence, in the case of generating the PN code as the long code by, for example, a 15-stage shift register and an exclusive-OR circuit, the upper limit of the value N is about 8 from the practical point of view.

The carrier signal generator 18, the multiplier 19, the amplifier 21 and the antenna 22 constitute a transmitting part 15. The afore-mentioned spread spectrum baseband modulated signal $b_{sp}(n)$ is up-converted by the multiplier 19 with the carrier signal CW from the carrier signal generator 18, then amplified by the transmitting amplifier 21 and transmitted as a transmission modulated wave from the antenna 22.

Figure 3:
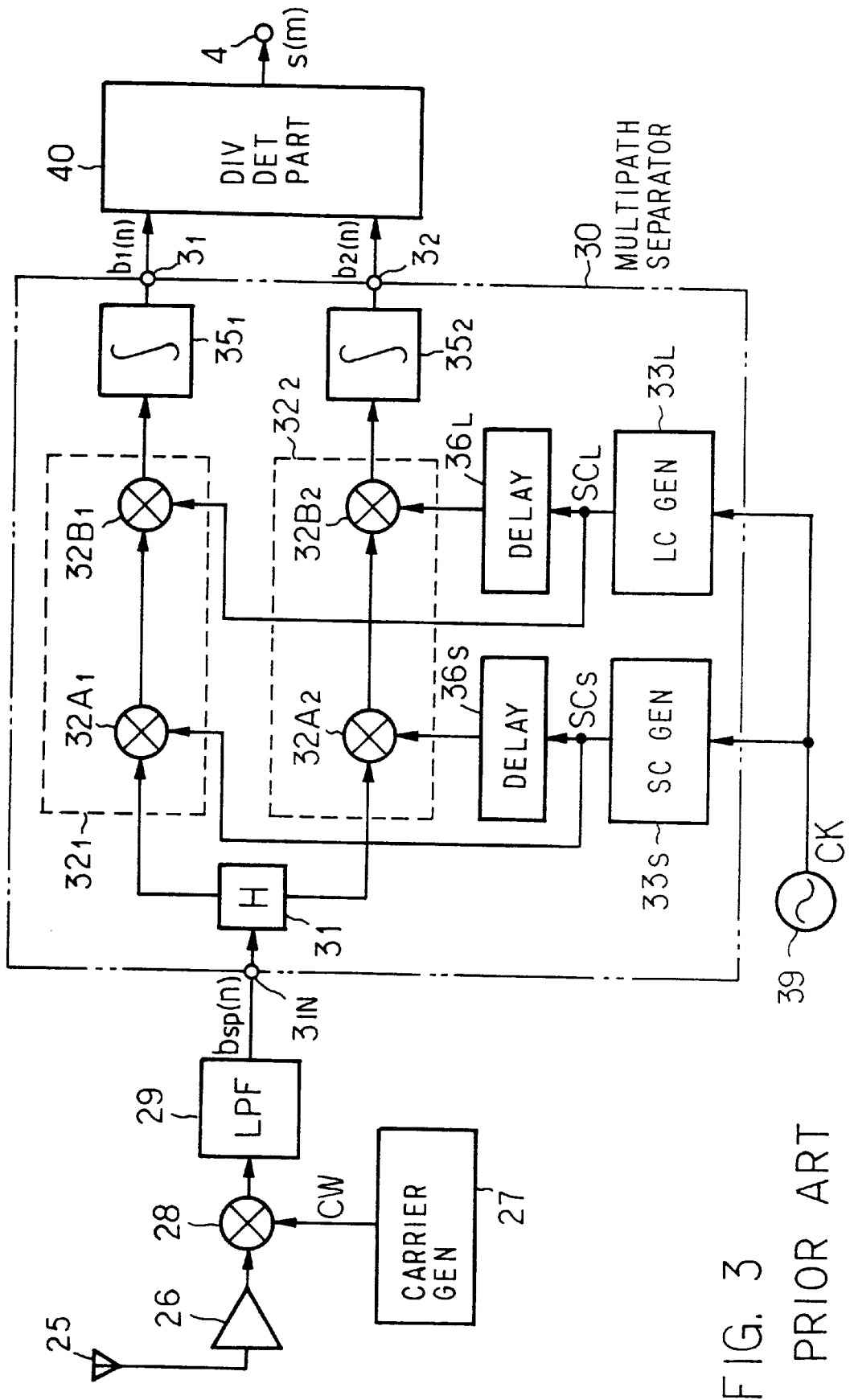
FIG. 3 is a block diagram of a conventional DS-CDMA receiver.

A description will be given, with reference to FIG. 6, of an embodiment of the spread spectrum receiver of the present invention, in which the parts corresponding to those in FIG. 3 are identified by the same reference numerals. The operation of the receiver will be described on the assumption that the received wave is based on a two-path model composed of a direct path and a delayed path. In the first place, the transmitted wave is received by the antenna 25. The received wave is amplified by the low-noise amplifier 26 and multiplied by the carrier signal CW from the carrier signal generator 27, thereafter being input into the low-pass filter 29. This operation corresponds to down-converting, and the low-pass filter 29 outputs the spread baseband received signal $b_{sp}(n)$. The antenna 25, the amplifier 26, the carrier signal generator 27, the multiplier 28 and the low-pass filter 29 form a receiving part 20.

The spread baseband received signal $b_{sp}(n)$ is branched by the hybrid circuit 31 to despreading paths corresponding to the direct path and the delayed path, and fed to the despreading parts $32_1$ and $32_2$, respectively. The multiplier $32A_1$ of the despreading part $32_1$ multiplies the spread baseband received signal $b_{sp}(n)$ by the short code $SC_S$ from the short code generator $33_S$ and applies the multiplied result to the other multiplier $32B_1$ of the despreading part $32_1$. The multiplier $32B_1$ further multiplies the multiplied result by the long code $SC_L$ from the long code generator $33_L$ to obtain the despread baseband modulated signal $b_1(n)$, which is applied to the integrator $35_1$. The integrator $35_1$ outputs an accumulated value of a series of latest multiplied results of the same number as the chip number of the short code. Incidentally, the short code generator $33_S$ and the long code generator $33_L$ are identical in configuration with the counterparts $13_S$ and $13_L$ in the transmitter shown in FIG. 4 and generate the same short and long codes $SC_S$ and $SC_L$ as those in FIG. 4. Further, as is the case with FIG. 4, the long code generator $33_L$ is driven by a frequency-divided clock signal $CK_L$ (of a clock frequency $1/(NT_C)$, where N is an integer equal to or greater than 2) obtained by frequency-dividing the clock signal of the frequency $1/T_C$ from the clock generator 39 by a frequency divider circuit 37 down to 1/N, and the chip period of the long code $SC_L$ is $NT_C$. The operations of the multipliers $32A_1$ and $32B_1$ and the integrator $35_1$ mentioned above correspond to despreading. The spreading codes $SC_S$ and $SC_L$ have so high an auto-correlation that the extracted signal level drops sharply due to even a slight difference in timing between the spreading codes in the transmission and reception.

Assuming that the spreading timing of the short and long codes $SC_S$ and $SC_L$ in the direct path coincides with the timing of the short and long codes $SC_S$ and $SC_L$ which are provided from the short code generator $33_S$ and the long code generator $33_L$, respectively, the path component of the direct path is extracted by the integrator $35_1$ and output therefrom as the despread baseband modulated signal $b_1(n)$. Similarly, the multiplier $32A_2$ of the despreading part $32_2$ multiplies the spread baseband received signal $b_{sp}(n)$ by the delayed short code $SC_S$ from the delay circuit $36_S$ and provides the multiplied result to the other multiplier $32B_2$. The multiplier $32B_2$ further multiplies the multiplied result by the delayed long code $SC_L$ from the delay circuit $36_L$ to obtain the despread baseband modulated signal $b_2(n)$, which is output via the integrator $35_2$ serving as a low-pass filter. This operation corresponds to despreading. In the delay circuits 36S and 36L there are set the delay times (the same value) of the delayed path relative to the direct path. The delay time is estimated by searching for the peak of the power of the despread baseband modulated signal. Supposing that the spreading timing by the short and long codes in the delayed path coincides with the timing of the delayed short and long codes $SC_S$ and $SC_L$, the path component of the delayed path is extracted by the integrator $35_2$ and output as the despread baseband modulated signal $b_2(n)$. The hybrid circuit 31, the despreading parts $32_1$ and $32_2$, the integrators $35_1$ and $35_2$, the delay circuits $36_S$ and $36_L$, the short code generator $33_S$ and the long code generator $33_1$ form the multipath separating part 30.

The short code $SC_S$ has a small chip number (tens to hundreds, for instance), and hence its auto-correlation is appreciably duller than that of the long code $SC_L$. On this account, two identical short codes of different phases have a relatively high auto-correlation and the output from the multiplier $32A_1$, despread by the short code $SC_S$ in synchronization with the direct path, contains the despread baseband signal component of the delayed path to some extent. Likewise, the output from the multiplier $32A_2$, despread by the short code $SC_S$ in synchronization with the delayed path, contains the despread baseband signal component of the direct path to some extent. Moreover, the despread baseband modulated signal of the direct path could be obtained by multiplying the long code $SC_L$ at correct timing in the multiplier $32B_1$, but according to the present invention, since the chip period $T_{CL}$ of the long code is made longer than the delay time of the delayed path, the long code is correlated with that of the delayed path as well and the output from the multiplier $32B_1$ contains the despread signal component of the delayed path as well as the despread baseband modulated signal of the direct path. Likewise, the despread output from the multiplier $32B_2$ contains the despread baseband modulated signal of the delayed path and the despread baseband modulated signal component of the direct path. Consequently, when the correlation of the fading complex envelope between the direct path and the delayed path is 1, the output from the integrator $35_1$ contains a despread baseband modulated signal S1 of the direct path and a despread baseband modulated signal component s2 of the delayed path delayed behind it by a time $\Delta$ as schematically shown in FIG. 7-Row A.

Figure 7:
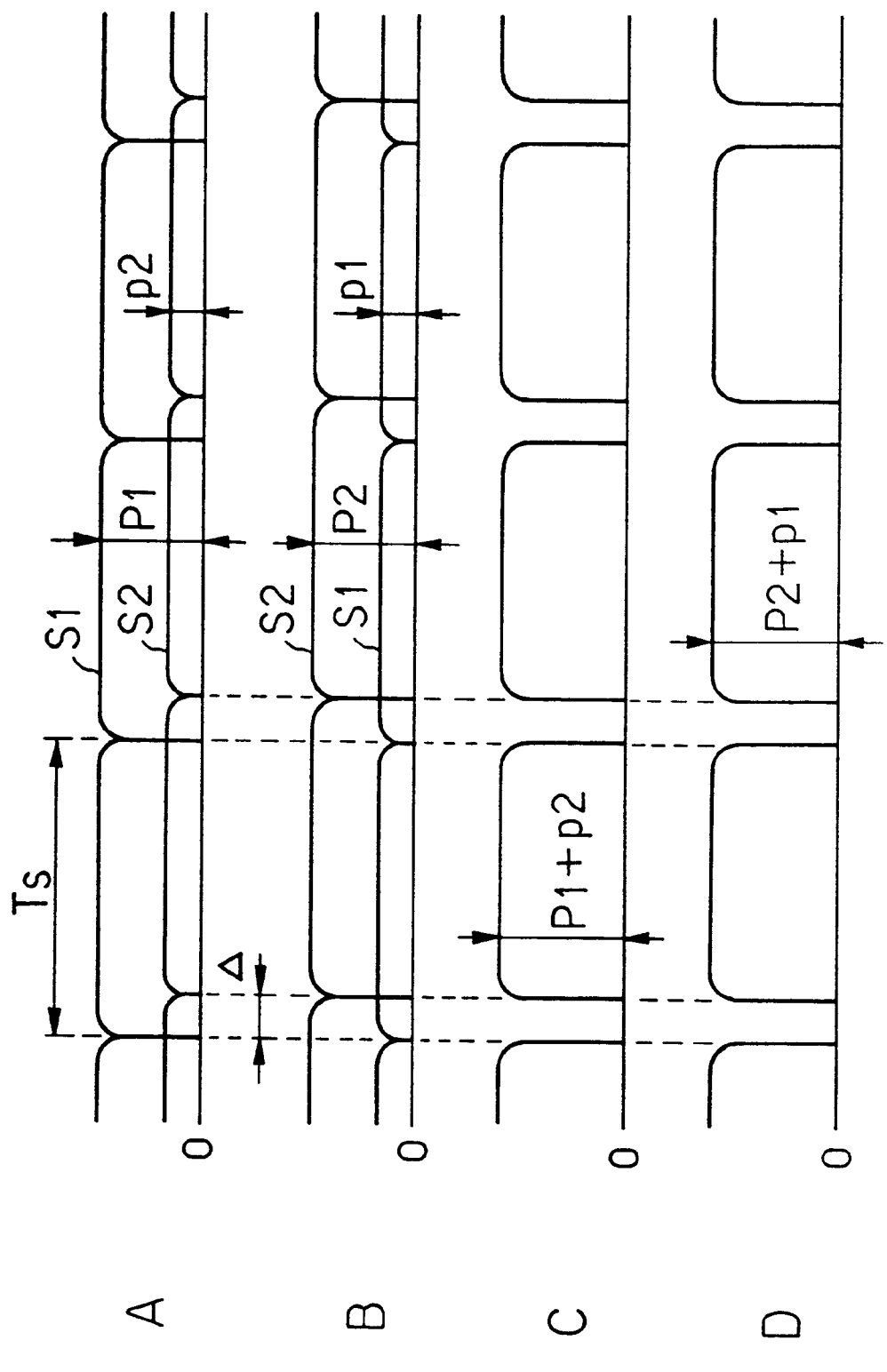
FIG. 7 is a power waveform diagram schematically showing respective path components of a signal that are detected by the receiver of the present invention.

In FIG. 7A, waveforms of these two components are shown with respect to the level 0 so as to make a distinction between their power levels P1 and p2, but in the same symbol period these two signals originally correspond to the same symbol of the same baseband modulated signal b(n) and the integrator $35_1$ provides at its output a composite signal waveform of a level P1+p2 obtained by combining these two components as shown in FIG. 7-Row C, for instance. The definite symbol period of this composite signal waveform is $(T_S-\Delta)$ and adjacent symbol periods are separated by an indefinite period of a width $\Delta$. Similarly, the output from the integrator $35_2$ contains a despread baseband modulated signal S2 of the delayed path and a despread baseband modulated signal component s1 of the direct path as depicted in FIG. 7-Row B. Letting their power levels be represented by P2 and p1, respectively, the composite waveform at the output of the integrator $35_2$ has a power level P2+p1 in the symbol period $(T_S-\Delta)$ as shown in FIG. 7-Row D. Thus, in either of the despreading route corresponding to the direct path and the despreading route corresponding to the delayed path, the despread baseband modulated signal is added with the despread baseband signal component of the other path and the SN ratio is improved accordingly in the symbol period $(T_S-\Delta)$. Hence, the decision error rate could be reduced by making a signal decision in the symbol period $(T_S-\Delta)$. In practice, since the delay time difference $\Delta$ is very small as compared with the symbol period $T_S$ (the symbol period $T_S$ of the transmission signal being selected so), it is possible to make effective use of received signal energies of both the direct and the delayed path for detecting the baseband signal by performing diversity detection in the diversity detecting part 40 in disregard of the indefinite periods $\Delta$ in the despread baseband composite signals provided from the integrators $35_1$ and $35_2$.

In contrast to the invention described above with reference to FIGS. 4 and 6, according to the conventional DS-CDMA system shown in FIGS. 1 and 3, the integrator $35_1$ and $35_2$ of the receiver in FIG. 3 provide at their outputs only the direct-path despread baseband modulated signal Si of the level P1 and the delayed-path despread baseband modulated signal S2 of the level P2 depicted in FIG. 7-Rows A and B; namely, neither of the integrator outputs contains the other path component s2 or s1 based on such a cross correlation as used in the present invention. These components are rather randomized and added as noise to the despread baseband modulated signals S1 and S2. Thus the present invention materially improves the SN ratio of the despread baseband modulated signal as compared with the conventional system shown in FIGS. 1 and 3. In the receiver described in U.S. Pat. No. 4,969,159 mentioned previously herein, only the composite signal in FIG. 7-Row C is differential-detected but no diversity detection is made, hence there is no effective use of the delayed path relative to the direct path.

Figure 6:
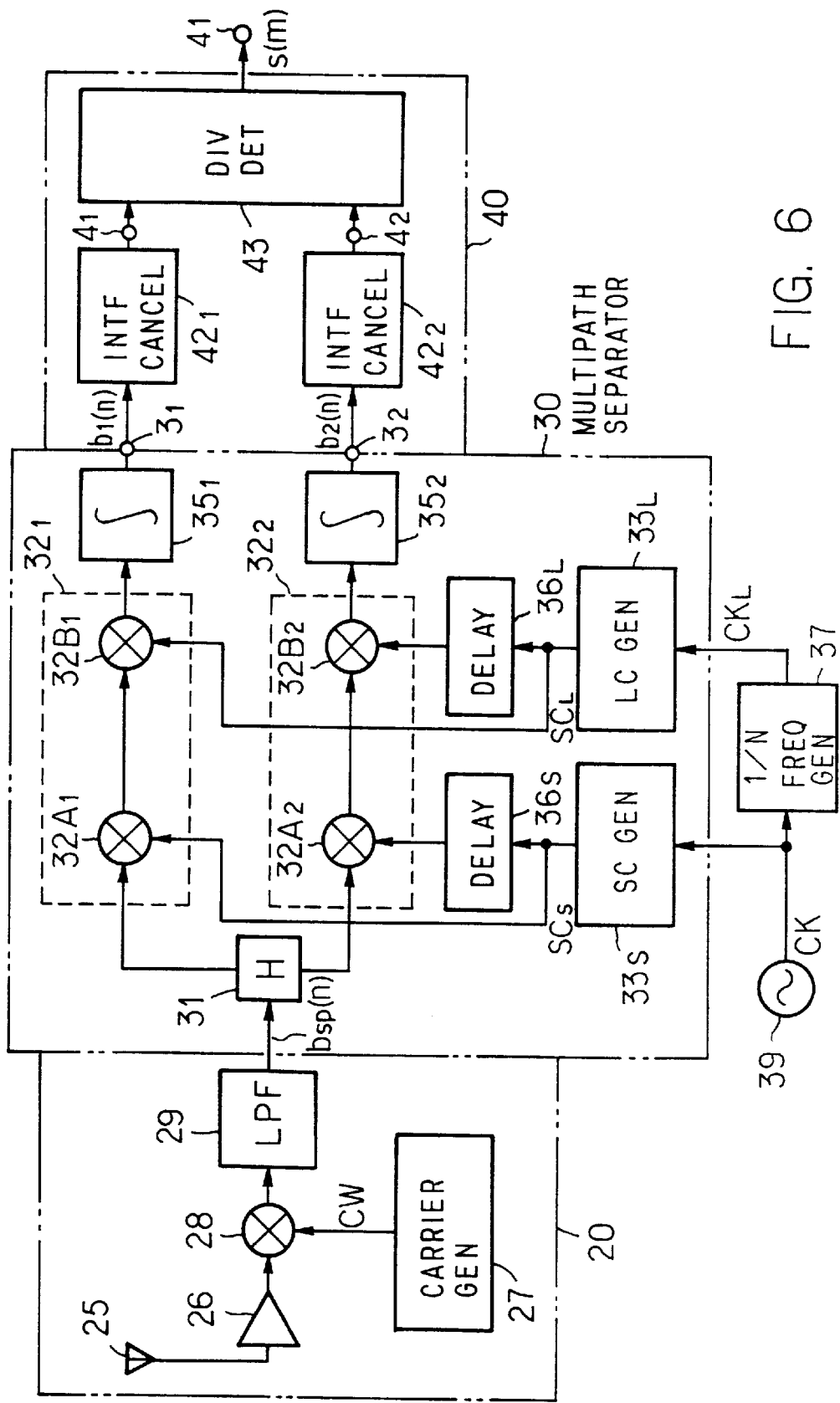
FIG. 6 is a block diagram illustrating an embodiment of the DS-CDMA receiver according to the present invention.

In the receiver of the FIG. 6 embodiment, the outputs from the integrators $35_1$ and $35_2$ are linearly combined in the diversity detecting part 40, by which the digital signal s(m) is detected, from which it is output to the terminal 41. In the FIG. 6 embodiment, prior to the diversity detection in the diversity detecting part 40, the integrator outputs are fed to interference cancelers $42_1$ and $42_2$ for cancellation of interference signals attributable to the correlation between short codes assigned to other users in the same cell and the short code $SC_S$ used for the desired signal.

The diversity detecting part 40 in this embodiment is made up of the interference cancelers $42_1$ and $42_2$ and a diversity type detector 43. The interference cancelers $42_1$ and $42_2$ are supplied with the despread baseband modulated signals $b_1(n)$ and $b_2(n)$ from the integrators $35_1$ and $35_2$, respectively, and cancel the interference signal components of other users contained in the despread baseband modulated signals. Since the multipath components of different delay times contained in the despread baseband modulated signals from the spreading part $32_1$ ($32_2$) of each route have a correlation with respect to the long code as referred to previously, the multipath component of the desired signal is also detected. The interference cancelers $42_1$ and $42_2$ are used to cancel the interference signal components contained in the respective path components that arise from the correlation between the short codes of the desired signal of other users. The interference cancelers $42_1$ and $42_2$ can each be formed by a simple configuration of the type linearly combining the input signal, but other configurations can also be employed. The diversity type detector 43 receives the interference-canceled baseband modulated signals from the interference cancelers $42_1$ and $42_2$, then makes a signal decision and outputs the decision signal to the terminal 41. A description will be given of specific operative examples of the interference cancelers $42_1$ and $42_2$ and the diversity type detector 43.

Figure 8:
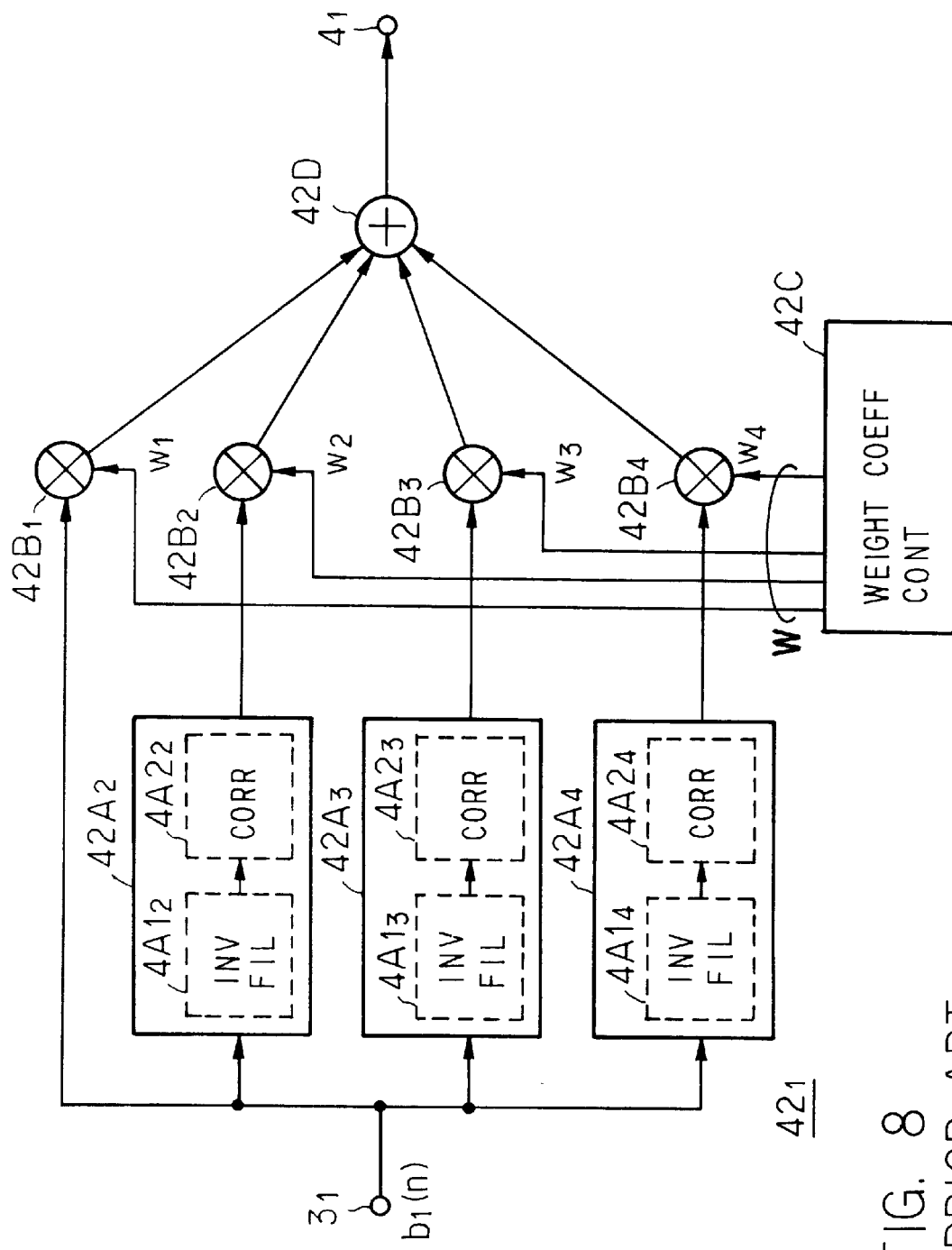
FIG. 8 is a block diagram showing an example of an interference canceler for use in the receiver of the present invention.

FIG. 8 illustrates an example of the interference canceler $42_1$ (the other interference canceler $42_2$ not being shown because it is identical in construction with the canceler $42_1$) through utilization of an interference canceler described in Lupa R. and S. Verdu, "Linear multiuser detectors for synchronous Code-Division Multiple-Access channels", IEEE Trans. Inform Theory., vol. IT-35, No. 1, pp.123–136, Jan. 1989. In FIG. 8, the despread baseband modulated signal $b_1(n)$ from the terminal 31 is applied to matching filters $42A_2$ to $42A_4$, wherein it is correlated with short codes $SC_{S2}$, $SC_{S3}$ and $SC_{S4}$ of other users. Since the signal $b_1(n)$ provided to the terminal $3_1$ is the baseband modulated signal already despread by the short code $SC_S$ for the desired signal, the multiplier $42B_1$ is supplied with the despread baseband modulated signal $b_1(n)$ intact, but other multipliers $42B_2$ to $42B_4$ are supplied with correlated outputs from the matching filters $42A_2$, $42A_3$ and $42A_4$ wherein the despread baseband modulated signal $b_1(n)$ is correlated with the short codes $SC_{S2}$, $SC_{S3}$ and $SC_{S4}$ of other users. In this embodiment, however, the matching filter $42A_2$ is composed of an inverse filter $4A1_2$ and a correlator $4A2_2$ with the short code of other user. The characteristic of the inverse filter $4A1_2$ is determined so that composite characteristic of the despreading by the short code in the preceding stage and the matching filter constitute a filter equivalent to the matching filter which outputs the correlation of the short code $SCS_2$ of other user with the baseband received signal when no despreading is done in the multiplier $32A_1$ in FIG. 6. In practice, the inverse filter $4A1_2$ is formed by a spreader which spreads the despread baseband modulated signal $b_1(n)$ from the terminal $3_1$ by multiplying it by the short code $SC_S$ from the short code generator $33_S$ in FIG. 6. The matching filters $42A_3$ and $42A_4$ are also identical in construction with that $42A_2$ and outputs the correlations between the short codes $SC_{S3}$ and $SC_{S4}$ of other users, and the despread baseband modulated signal $b_1(n)$ when no despreading is done in the multiplier $32A_1$ in FIG. 6, respectively.

The despread baseband modulated signal $b_1(n)$ from the terminal $3_1$ contains an interference signal component of other user as well as the desired signal. Since this interference signal component can be expressed as a linear coupling or combination of the output signals from the matching filters $42A_2$ to $42A_4$, an interference signal could be prevented from being contained in the composite signal that is the output from an adder 42D, by adjusting or controlling weighting coefficients or factors $w_1$ to $w_4$ by which the signal fed directly from the terminal $3_1$ and the outputs from the matching filters $42A_2$ to $42A_4$ are multiplied in the multipliers $42B_1$ to $42B_4$, respectively. This mathematically corresponds to the extraction of a component orthogonal to the interference signal as the despreading signal of the desired signal. In the interference canceler of such an operation, a weighting factor control part 42C calculates an inverse matrix of a correlation matrix of the spreading codes on the basis of information about the spreading codes and receiving timing of users and outputs specific or particular elements of the inverse matrix as weighting factors $w_1$ to $w_4$.

Figure 9:
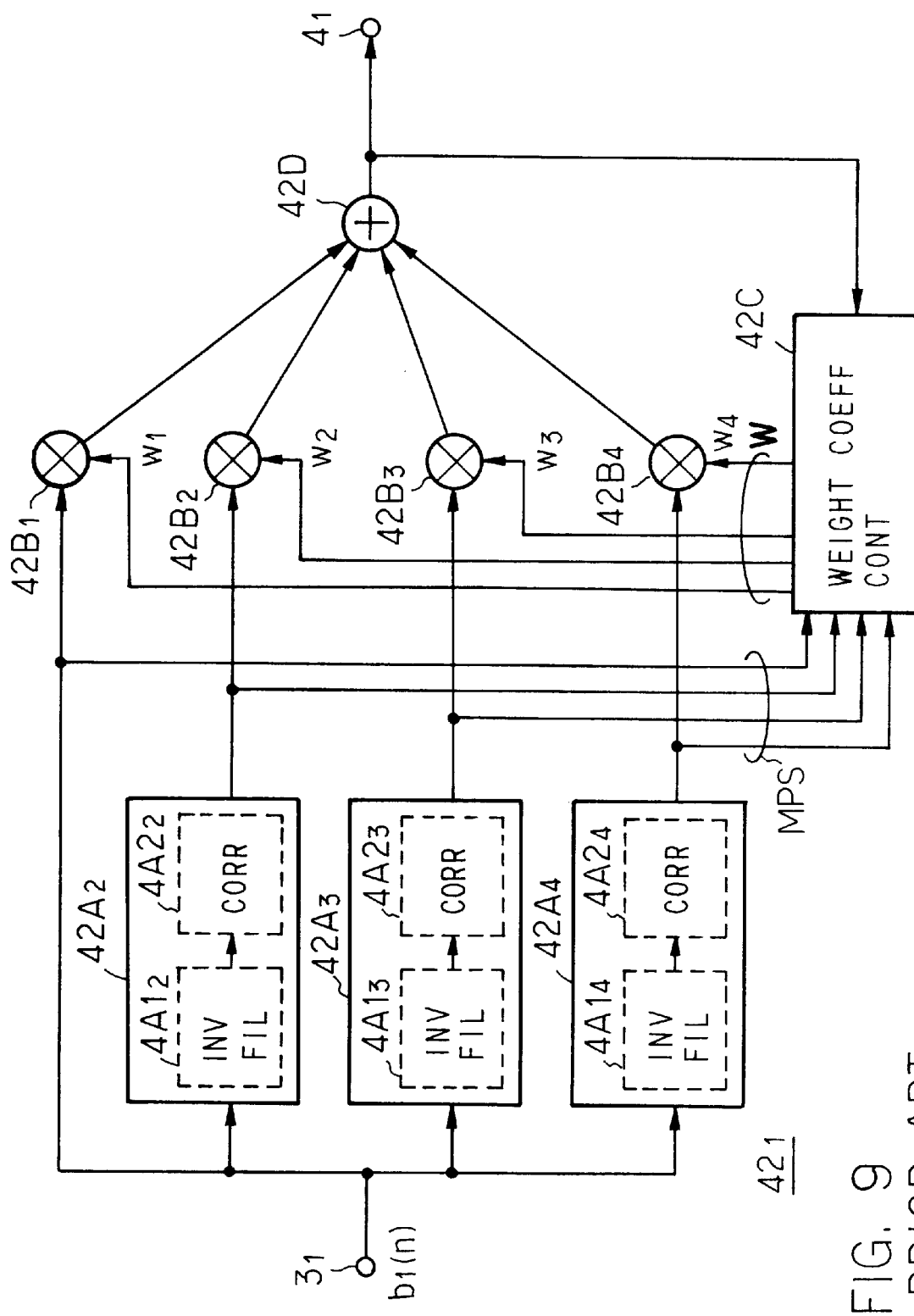
FIG. 9 is a block diagram showing another example of the interference canceler for use in the receiver of the present invention.

The interference canceler of FIG. 8 requires information bout short codes and receiving timing of all users for its operation. In FIG. 9 there is illustrated an example of an interference canceller which has solved this problem. This canceler utilizes what is disclosed in K. Fukawa and H. Suzuki, "Orthogonalizing Matched Filter (OMF) Detection for DS-CDMA Mobile Radio Systems," IEEE Globecom 1994, pp.385–389, Nov. 1994. As is the case with FIG. 8, the interference canceler of FIG. 9 also comprises the matching filters $42A_2$ to $42A_4$, the multipliers $42B_1$ to $42B_4$, the adder 42D and the weighting factor control part 42C, and the matching filters $42A_2$ to $42A_4$ are also identical in construction with the counterparts in FIG. 8. In this embodiment, however, the short codes $SC_{S2}$, $SC_{S3}$ and $SC_{S4}$ which are provided to the correlators of the respective matching filters need not be spreading codes of other users but the short codes need only to be orthogonal to the short code $SC_S$ of the desired signal and to one another. The multipliers $42B_1$ to $42B_4$ multiply the despread baseband modulated signals from the terminal $3_1$ and the matching filters $42A_2$ to $42A_4$ by the weighting factors $w_1$ to $w_4$, and the multiplied outputs are added by the adder 42D into a composite signal, which is provided to the terminal $4_1$. Based on the correlated output from the matching filters $42A_2$ to $42A_4$, the despread baseband modulated signal from the terminal $3_1$ and the composite signal from the adder 42D, the weighting factor control part 42C calculates and outputs the weighting factors $w_1$ to $w_4$ by an algorithm which minimizes the mean power of the composite signal from the adder 42D under the constraint of the weighting factors.

Next, a description will be given, with reference to FIGS. 10A, 10B and 10C, of examples of the diversity detector 43 in the receiver of FIG. 6. While two input terminals are shown to be connected to the terminals $3_1$ and 32 in FIG. 6, they may be connected to the terminals $4_1$ and $4_2$.

Figure 10A:
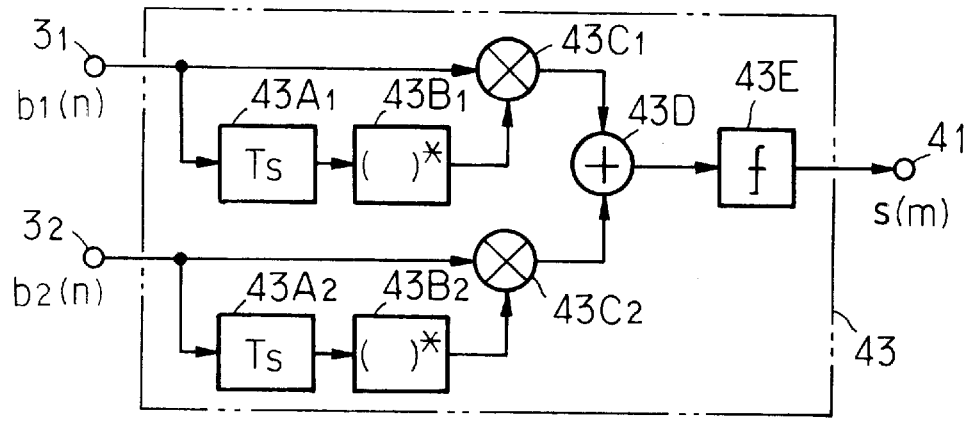
FIG. 10A is a block diagram showing an example of a diversity detector for use in the receiver of the present invention.

FIG. 10A illustrates an example of the diversity detector 43 of the type utilizing the differential detection scheme and is disclosed in John G. Proaks, "Digital Communications," 2nd edition, p. 738. In this example, the despread baseband modulated signals $b_1(n)$ and $b_2(n)$ input via terminals $3_1$ and $3_2$, respectively, and signals obtained by delaying these signals in delay stages $43A_1$ and $43A_2$ for one symbol time $T_S$ and then subjecting the delayed outputs to complex conjugate operations denoted by ( )*in complex conjugate operating parts $43B_1$ and $43B_2$ are multiplied by multipliers $43C_1$ and $43C_2$, respectively, by which the differential detection is carried out. The group consisting of the delay stage $43A_1$, the operating part $43B_1$ and the multiplier $43C_1$ forms a differential detection circuit, and the group consisting of the delay stage $43A_2$, the operating part $43B_2$ and the multiplier $43C_2$ also forms another differential detection circuit. The multiplied outputs from the multipliers $43C_1$ and $43C_2$ are added by an adder 43D, then the added output is input into a decision part 43E, which makes a signal decision by the hard decision and provides the decision result s(m) to an output terminal 41.

Figure 10B:
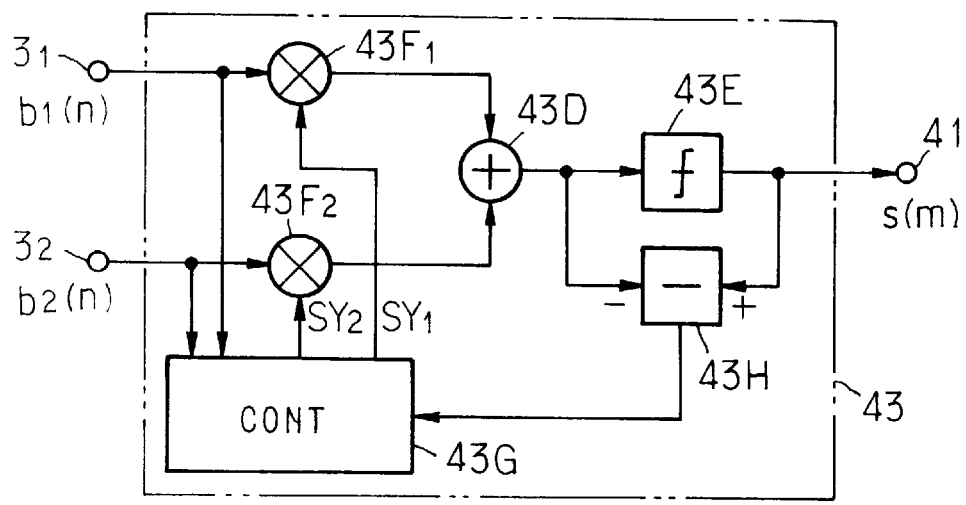
FIG. 10B is a block diagram showing another example of the diversity detector for use in the receiver of the present invention.

FIG. 10B illustrates an example of the diversity detector 43 which employs the coherent or synchronous detection scheme, and this is described in H. Suzuki, "Signal Transmission Characteristics of Diversity Reception with Least Squares Combining," Transactions of the Institute of Electronics, Information and Communication engineers, B-II, Vol. J75-B-II, No. 8, pp.524–534, August 1992. In this example, the despread baseband modulated signals $b_1(n)$ and $b_2(n)$ input via the terminals 31 and 32 are multiplied in multipliers $43F_1$ and $43F_2$ by estimated carrier synchronization signals $SY_1$ and $SY_2$ from a control part 43G to obtain signals synchronized with the carrier phases. The multiplied output signals are added together by the adder 43D and the adder output is applied to the decision part 43E. The decision part 43E makes a signal decision by the hard decision and provides the decision result s(m) to the terminal 41. A subtractor 43H outputs, as an estimation error signal, the difference between the input to and output from the decision part 43E. The control part 43G receives the estimation error signal from the subtractor 43H and the despread signals $b_1(n)$ and $b_2(n)$ from the input terminals $3_1$ and $3_2$ and estimates and outputs the afore-mentioned estimated carrier synchronization signals $SY_1$ and $SY_2$ so that the square of the absolute values of the estimation errors may be minimized.

Figure 10C:
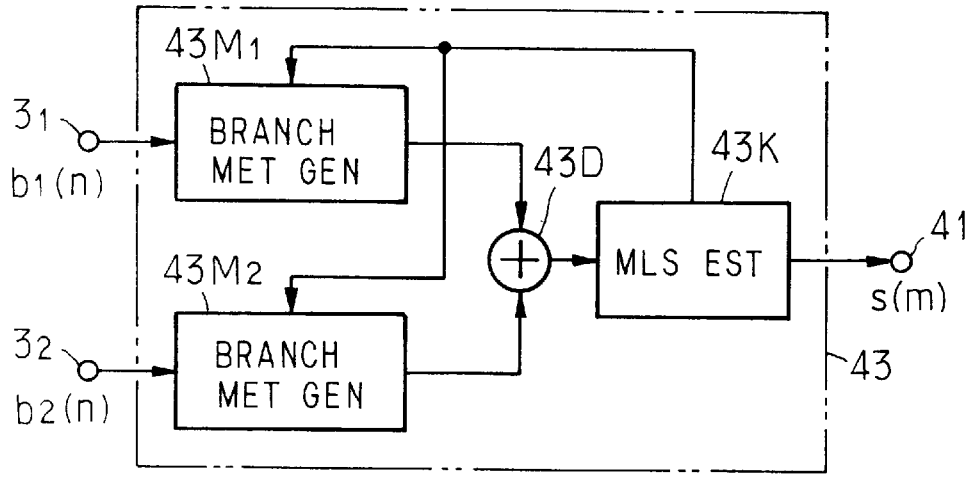
FIG. 10C is a block diagram showing another example of the diversity detector for use in the receiver of the present invention.

FIG. 10C illustrates an example of the diversity detector 43 which employs a predictive coherent detection scheme, and this is disclosed in Fukawa and Suzuki, "A RAKE Receiver with Interference Canceler for Mobile Radio Communications," Technical Report of IEICE, RCS93-51, September 1993. In this example, branch metric generating parts $43M_1$ and $43M_2$ are provided in the despreading routes corresponding to the direct and delayed paths, respectively, and the branch metric generating parts $43M_1$ and $43M_2$ receive the despread baseband modulated signals $b_1(n)$ and $b_2(n)$, respectively, and further receive, in common, a symbol sequence candidate from a maximum likelihood sequence estimating part 43K and output likelihood information signals. The adder 43D adds the likelihood information signals and applies the added output to the maximum likelihood sequence estimating part 43K. The maximum likelihood sequence estimating part 43K calculates a logarithmic likelihood function on the basis of the added value input thereto, then selects by the Viterbi algorithm a symbol sequence candidate which maximizes the logarithmic likelihood function and outputs the selected symbol sequence as the digital signal s(m) to the terminal 41.

Figure 13:
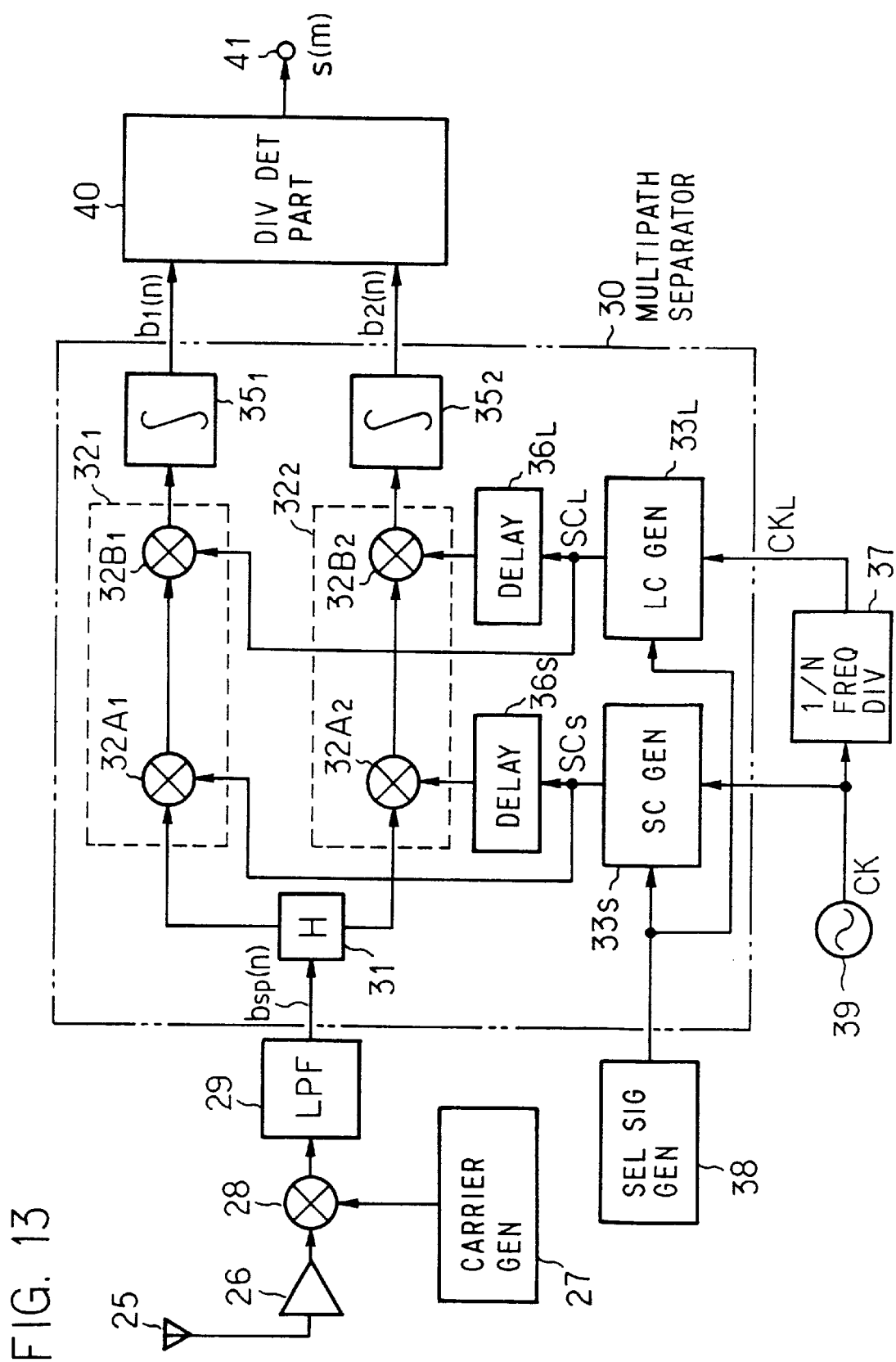
FIG. 13 is a block diagram illustrating an embodiment of a receiver corresponding to the transmitter depicted in FIG.

In the DS-CDMA system the transmission symbol period (the symbol length) $T_S$ and the short code period (the code length) are selected so that they coincide with each other; hence, in the case of changing the bit rate of the digital signal s(m) to be transmitted in the transmitter of the FIG. 4 embodiment, the frequency of the clock signal CK by the clock generator 17 must be changed correspondingly. In such an instance, the chip rates of the short and long codes $SC_S$ and $SC_L$ to be generated also change and the spectral bandwidth of the spread baseband modulated signal $b_{sp}(n)$, which is the output from the multiplier 14B, changes, with the result that the bandwidth of the transmission wave to be sent from the antenna 22 also changes accordingly. In the actual DS-CDMA communication system, however, it is not preferable that the spectral bandwidth of the communication channel used, defined by each short code, undergoes variations. Next, a description will be given, with reference to FIG. 11, of a receiver improved from that of FIG. 4 so that the spectral bandwidth of the transmission wave can be held substantially constant with respect to any of a plurality of predetermined bit rates of the input digital signal. In FIG. 13 there is illustrated an embodiment of the receiver corresponding to the improved transmitter.

FIG. 11 illustrates a modified form of the FIG. 4 embodiment, in which the chip numbers K of the short and long codes by the short and long code generators $13_S$ and $13_L$ are made variable in accordance with the bit rate of the input digital signal s(m) and the short code generator $13_S$ is controlled according to the transmission rate set in a select signal generating part 23 to generate a short code whose period coincides with the symbol period $T_S$ of the baseband modulated signal b(n) modulated from the input signal. An example of the configuration of the short code generator $13_S$ in this case is shown in FIG. 12.

Figure 12:
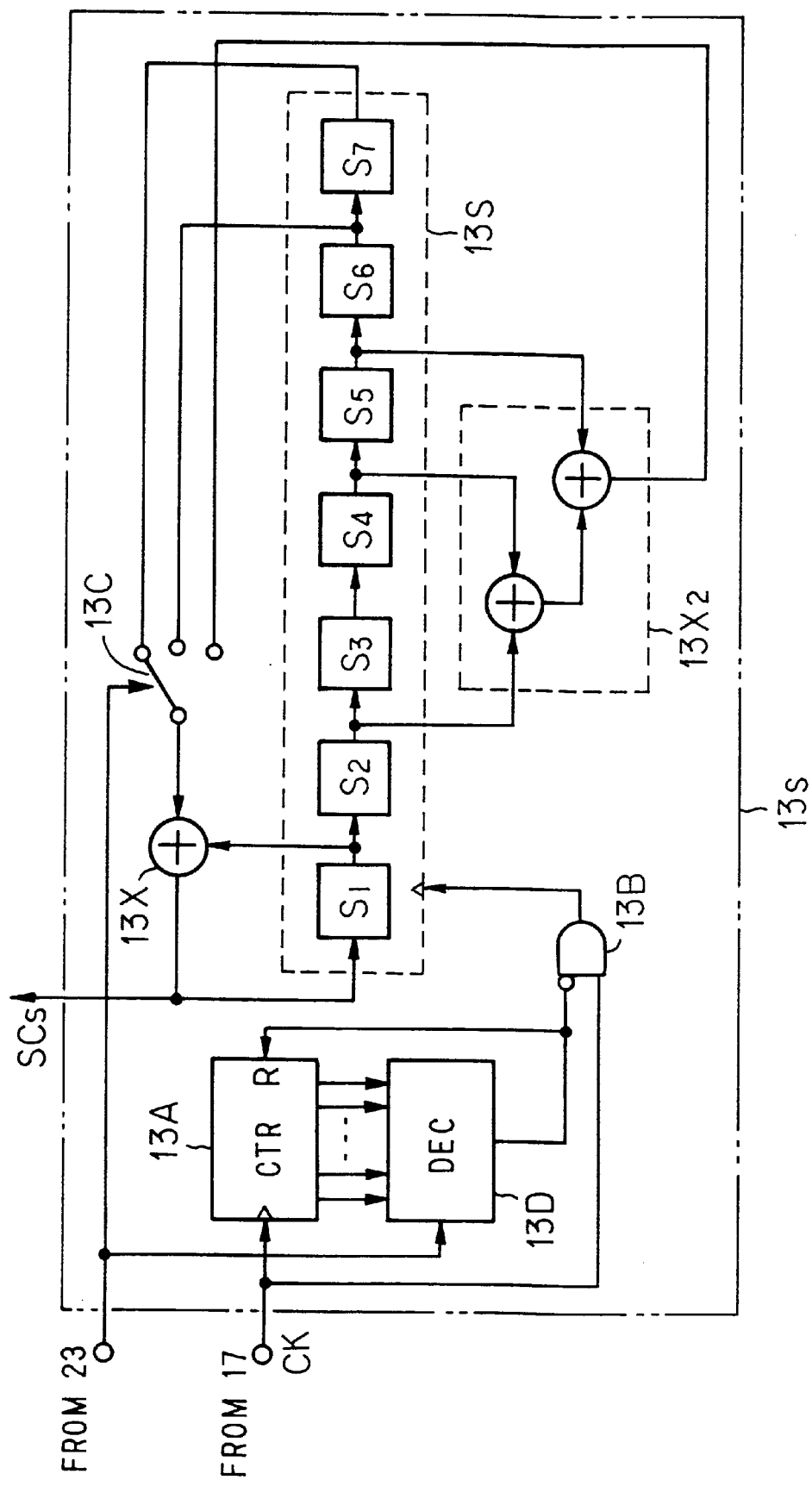
FIG. 12 is a block diagram of a short code generator used in the FIG. 11 embodiment.

In the case of using the PN sequence as the short code, the short code generator $13_S$ is provided with a shift register 13S which is driven by the clock signal CK as is well-known and an exclusive-OR circuit 13X as depicted in FIG. 12. By applying the outputs from at least two shift stages of the shift register 13S to the exclusive-OR circuit 13X and feeding its EXCLUSIVE ORed output back to the first stage of the shift register 13S, the spreading code can be repeatedly generated from any given input/output point of the shift register 13S. This embodiment is configured so that the outputs from three successive shift stages are selectively applied, as one input, to the exclusive-OR circuit 13X in accordance with the bit rate of the input digital signal s(m). For example, the number K of shift stages of the shift register 13S is set at 7 and either one of the exclusive-OR of the outputs from the second, fourth and fifth shift stages by another exclusive-OR circuit $13X_2$ and the outputs from the sixth and seventh shift registers are selected by a switch 13C. The exclusive-OR circuits 13X and $13X_2$ and the switch 13C constitute a selective exclusive-OR circuit which selects one of the exclusive-ORs of a plurality of shift stages of the shift register 13S. When the output from the exclusive-OR circuit $13X_2$ and the outputs from the sixth and seventh shift stages are respectively selected by the switch 13C, the spreading code generator 13 repeatedly generates codes having chip numbers of $2^5-1=31$, $2^6-1=63$ and $2^7-1=127$, respectively. Hence, when the frequency $1/T_C$ of the clock signal CK used is held constant, it is also possible to predetermine transmission rates of input signals so that the symbol periods of such chip numbers respectively coincide with code repetition periods of the lengths corresponding to the chip numbers. Since these code lengths bear such a relationship that they are each about twice longer than the immediately preceding one, the symbol lengths of input signals can be selected correspondingly.

Assume that the frequency of the clock signal CK is 1.0 MHz and hence the chip period $T_C$ of the short code is 1 μsec. When selecting the exclusive-OR circuit $13X_2$ and the sixth and seventh shift stages are respectively selected by the switch 13C, the periods $T_S$ of the codes whose chip numbers are 31, 63 and 127, generated by the short code generator $13_S$, are 31 μsec, 63 μsec and 127 μsec, respectively. When the modulation system of the baseband modulator 12 is BPSK, the input bit rate and the modulated symbol rate are the same and the transmission rates of input digital signals are 32.26 Kbits/sec, 15.87 Kbits/sec and 7.87 Kbits/sec in correspondence with the short codes of such chip numbers. Since these values do not bear the integral-multiple relation, such transmission rates are not suitable for use in the actual communication system. To permit a selection of practical transmission rates such as 32 Kbits/sec, 64 Kbits/sec and 128 Kbits/sec, a counter 13A, a decoder 13D and an AND circuit 13B, for instance, are provided as depicted in FIG. 12 and the clock signal CK is provided via the AND circuit 13B to a drive terminal of the shift register 13S while at the same time it is fed to the counter 13A.

In accordance with the transmission rate, any one of the chip numbers $2^5$, $2^6$ and $2^7$ is selectively set in the decoder 13D by the select signal generator 23, and when the count value of the counter 13A reaches the value set in the decoder 13D, the decoder 13D outputs and applies a coincidence signal "1" to the exclusive-OR circuit 13B to inhibit the passage therethrough of the clock signal and resets the counter 13A. As a result, the output from the decoder 13D goes to "0," releasing the AND circuit 13B from the inhibited state and hence permitting the passage therethrough of the clock signal CK. Since the supply of the clock signal to the shift register 13S is thus inhibited by one clock period every $2^5$th, $2^6$th or $2^7$th clock, the chip value of the output from the short code generator 13$_S$ at that point in time holds the immediately preceding state. Thus, this is equivalent to the generation of the short code of the chip number $2^5$, $2^6$ or $2^7$ by the selection with the switch 13C in the short code generator of FIG. 12. Since these chip numbers bear the integral-multiple relation to one another, the transmission rates of the input digital signal s(m) can also be selected to bear such an integral-multiple relation such as 128 Kbits/sec, 64 Kbits/sec and 32 Kbits/sec. In this example, the frequency $1/T_C$ of the clock signal CW needs only to be set at 4.096 MHz. Since the clock frequency can be held constant even if the transmission rate changes as mentioned above, the chip period $T_C$ of the short code is also constant and the spectral bandwidth of the transmission wave is also constant.

The long code generator 13$_L$ can also be configured in the same manner as the short code generator 13$_S$ shown in FIG. 12. In such an instance, however, the total number K of stages of the shift register is larger than the number K of the shift stages in the short code generator 13$_S$; it is set to K=15, for example. Alternatively, the long code generator 13$_L$ may be designed to generate long codes of the same chip number irrespective of the transmission rate as in the case of FIG. 4.

FIG. 13 illustrates in block form an embodiment of the receiver for use in combination with the transmitter of FIG. 11. This embodiment is identical in construction with the FIG. 6 embodiment except that the short and long code generators 33$_S$ and 33$_L$ each have the same configuration as described above in respect of FIG. 12 and that a select signal generator 38 is used to change the chip number without changing the chip period lengths of the spreading codes from the short and long code generators 33S and 33$_L$ in accordance with the symbol rate of the received signal.

Figure 14:
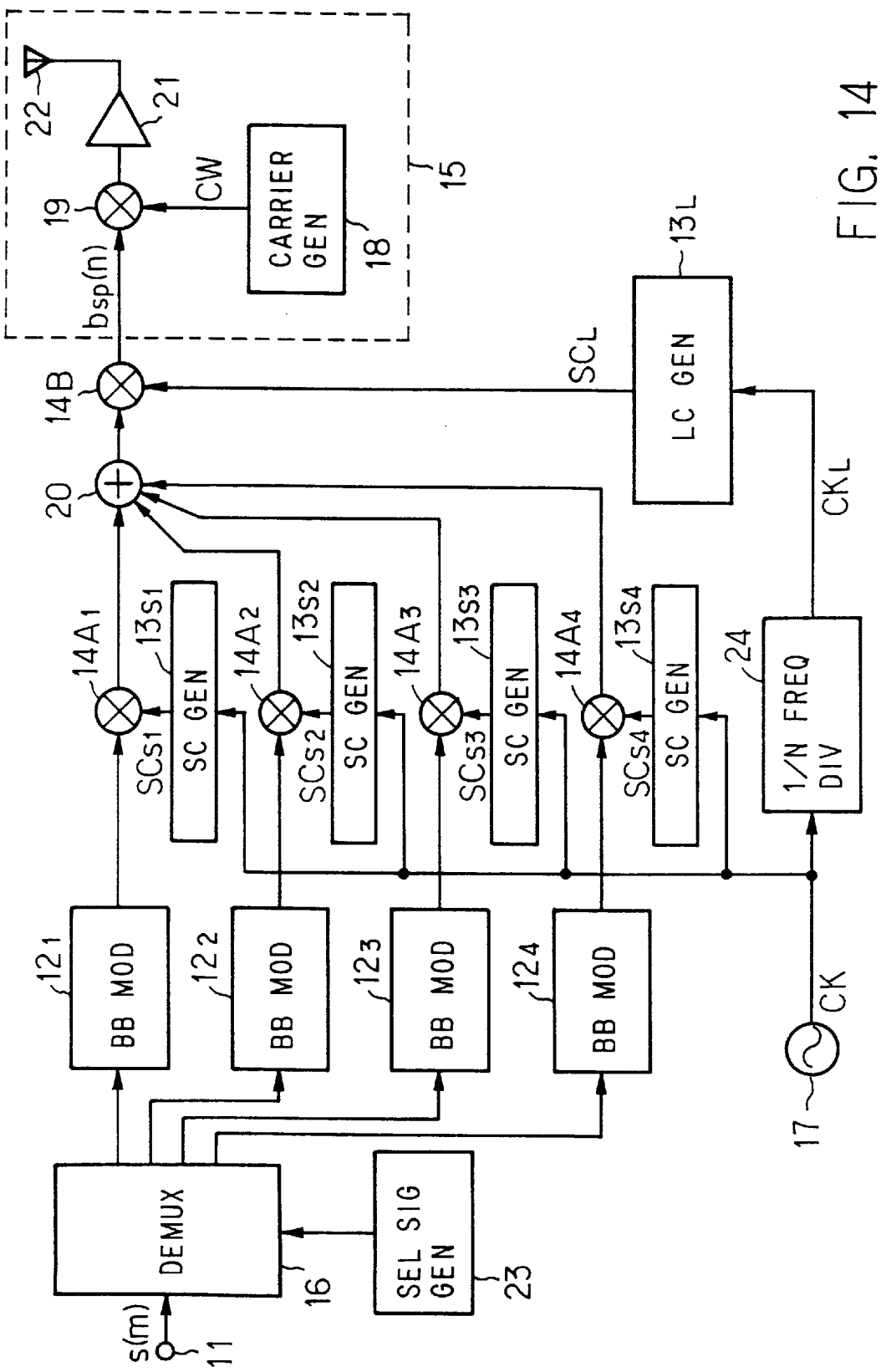
FIG. 14 is a block diagram illustrating another embodiment of the transmitter of the present invention which has a configuration capable of dealing with different transmission rates.
Figure 15:
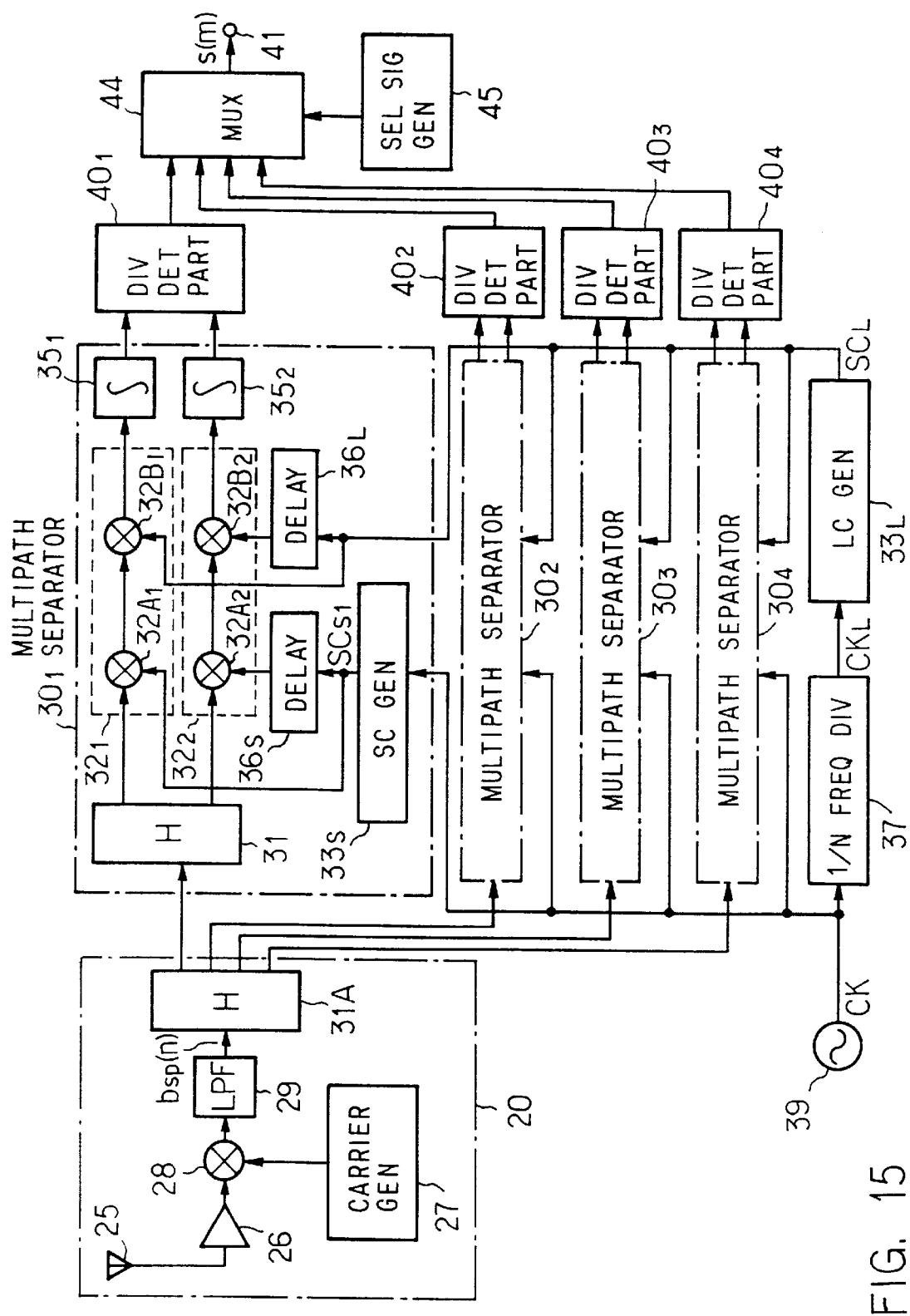
FIG. 15 is a block diagram illustrating an embodiment of the receiver corresponding to the transmitter depicted in FIG. 14.

In the embodiments of FIGS. 11 and 13, the spectral bandwidth of the transmission signal is held constant by changing the lengths (chip numbers) of the short and long codes according to the bit rate (or symbol rate) of the transmission signal. In FIG. 14 there is illustrated in block form an embodiment of a transmitter in which the digital signal s(m) to be transmitted is distributed to a plurality of signal sequences of fixed bit rates in accordance with the bit rate of the digital signal itself, then spread by different short codes and combined into a composite signal to thereby keep the spectral bandwidth of the transmission signal unchanged. FIG. 15 illustrates in block form an embodiment of a receiver for use in combination with the transmitter of FIG. 14.

In FIG. 14 the parts corresponding to those in FIG. 4 are identified by the same reference numerals. In the illustrated transmitter, a plurality of sets of a baseband modulator for the input digital signal of a fixed bit rate, a short code generator for generating the short code and a multiplier for multiplying the baseband modulated signal by the short code, and bits of the input digital signal s(m) are distributed by a demultiplexer 16 to the respective sets in accordance with the bit rate of the input digital signal so that respective signal sequences each have a predetermined bit rate. The FIG. 14 embodiment includes: the demultiplexer 16 for sequentially distributing the bits of the input digital signal s(m) to a desired number of sequences; four baseband modulators 12$_1$ to 12$_4$, short code generators 13$_S$, to 13$_{S4}$ for generating different short codes $SC_{S1}$, $SC_{S2}$, $SC_{S3}$ and $SC_{S4}$ having the same chip numbers, respectively; multipliers 14A$_1$ to 14A$_4$ for multiplying the modulated outputs from the baseband modulators 12$_1$ to 12$_4$ by the short codes; and an adder 20 for adding together the outputs from the multipliers 14A$_1$ to 14A$_4$. The short code generators 13$_{S1}$ to 13$_{S4}$ each generate a different short code with the same chip period and chip number as those of the short codes by the other short code generators in synchronization with the clock signal CK from the clock generator 17. Further, as is the case with the FIG. 4 embodiment, this transmitter has the clock generator 17, the 1/N frequency divider circuit 24, the long code generator 13$_L$, the multiplier 14B for multiplying the output from the adder 20 by the long code, the carrier signal generator 18, the multiplier 19 for modulating the carrier signal CW by the baseband modulated signal $b_{sp}(n)$ spread by the long code, the transmitting amplifier 21 and the antenna 22.

The bit rate of the input digital signal s(m) to the demultiplexer 16 is set to any one of 8 Kbits/sec, 16 Kbits/sec and 32 Kbits/sec, for instance. When the bit rate of the input digital signal s(m) is 8 Kbits/sec, the demultiplexer 16 supplies the bit string of the input digital signal s(m) intact to a predetermined one of the baseband modulators 12$_1$ to 12$_4$ (12$_1$, for example), then the thus obtained baseband modulated signal is spread in the multiplier 14A$_1$ by the short code $SC_{S1}$, and the resulting spread baseband modulated signal is fed via the adder 20 to the multiplier 14B. When the input digital signal s(m) has the bit rate of 16 Kbits/sec, the demultiplexer 16 distributes the bits of the input digital signal s(m) to two predetermined baseband modulators 12$_1$ to 12$_4$ (12$_1$ and 12$_2$, for example) alternately with each other, then two sequences of baseband modulated signals thus obtained are spread by the short codes $SC_{S1}$ and $SC_{S2}$ in the multipliers 14A$_1$ and 14A$_2$, respectively, and the resulting spread baseband modulated signals are added together by the adder 20, whose added output is fed to the multiplier 14B. When the input digital signal s(m) has the bit rate of 32 Kbits/sec, the demultiplexer 16 distributes the bits of the input digital signal s(m) to the baseband modulators 12$_1$ to 12$_4$ in a repeating cyclic order, then four sequences of baseband modulated signals are spread by the short codes $SC_{S1}$ to $SC_{S4}$ in the multipliers 14A$_1$ to 14A$_4$, respectively, and the resulting spread baseband modulated signals are added together by the adder 20, whose added output is fed to the multiplier 14B.

Thereafter, as in the transmitter of FIG. 4, the multiplier 14B further spreads the input spread baseband modulated signal by the long code $SC_L$ and the resulting spread output $b_{sp}(n)$ is used to modulate the carrier CW, which is sent via the antenna 22. Also in this embodiment, the clock signal for driving the long code generator 13$_L$ is obtained by frequency-dividing the clock signal CK (of the period $T_C$) for the short code generators 13$_{S1}$ to 13$_{S4}$ by the 1/N frequency divider 17 down to 1/N so that the chip period $NT_C$ of the long code becomes longer than the delay time of the delayed path of nonnegligible power relative to the direct path in the propagation path.

FIG. 15 illustrates in block form an embodiment of the receiver corresponding to the transmitter of the FIG. 14 embodiment. In this embodiment there are provided four multipath separating parts 30$_1$ to 30$_4$ corresponding to four different short codes. Since the multipath separating parts 30$_1$ to 30$_4$ are identical in construction, only the multipath separating part 30$_1$ is shown. As in the case of FIG. 6, the multipath separating part 30$_1$ has, in the one despreading route corresponding to the direct path, the multiplier 32A, for despreading the baseband received signal by the short code, the multiplier 32B$_1$ for further despreading the despread baseband received signal from the multiplier 32A$_1$ by the long code and the integrator 35$_1$ and, in the other despreading route corresponding to the delayed path, the multiplier $32A_2$ for despreading the spread baseband received signal by the short code, the multiplier $32B_2$ for further despreading the despread baseband received signal from the multiplier $32A_2$ by the long code and the integrator $35_2$. The multipath separating part $30_1$ further includes the short code generator $33_S$ for generating the short code and the delay circuits $36_S$ and $36_L$ for delaying the short code and the long code by the delay time of the delay path relative to the direct path. Since the four multipath separating parts $30_1$ to $30_4$ use the same long code $SC_L$, however, there is provided one common long code generator $33_L$ for providing the same long code $SC_L$ to the four multipath separating parts $30_1$ to $30_4$.

The short code generators of the multipath separating parts $30_1$ to $30_4$ generate the same short codes as those generated by the corresponding short code generators $13_{S1}$ to $13_{S4}$ in the transmitter of FIG. 14. Moreover, the pairs of despread baseband modulated signals corresponding to the direct and delayed paths, generated by the multipath separating parts $13_{S1}$ to $13_{S4}$, are each fed to the corresponding one of the diversity type detecting parts $40_1$ to $40_4$ for diversity detection, and the detected outputs are provided to a multiplexer 44. A select signal generating part 45 applies a select signal to the multiplexer 44 in accordance with the transmission rate of the received signal so that the multiplexer 44 applies therethrough the output from the detecting part $40_1$ intact to the terminal 41 in the case of 8 Kbits/sec, selects the outputs from the detecting part $40_1$ and $40_2$ alternately for each bit and applies them as a single sequence to the terminal 41 in the case of 16 Kbits/sec, and selects the outputs from all the detecting parts $40_1$ to $40_4$ in a repeating cyclic order for each bit and applies them as a single sequence to the terminal 41 in the case of 32 Kbits/sec.

With the transmitter of FIG. 14 and the receiver of FIG. 15, the spectral bandwidth of the transmission wave can be held substantially constant even if the transmission rate of the transmission signal is changed.

Figure 16:
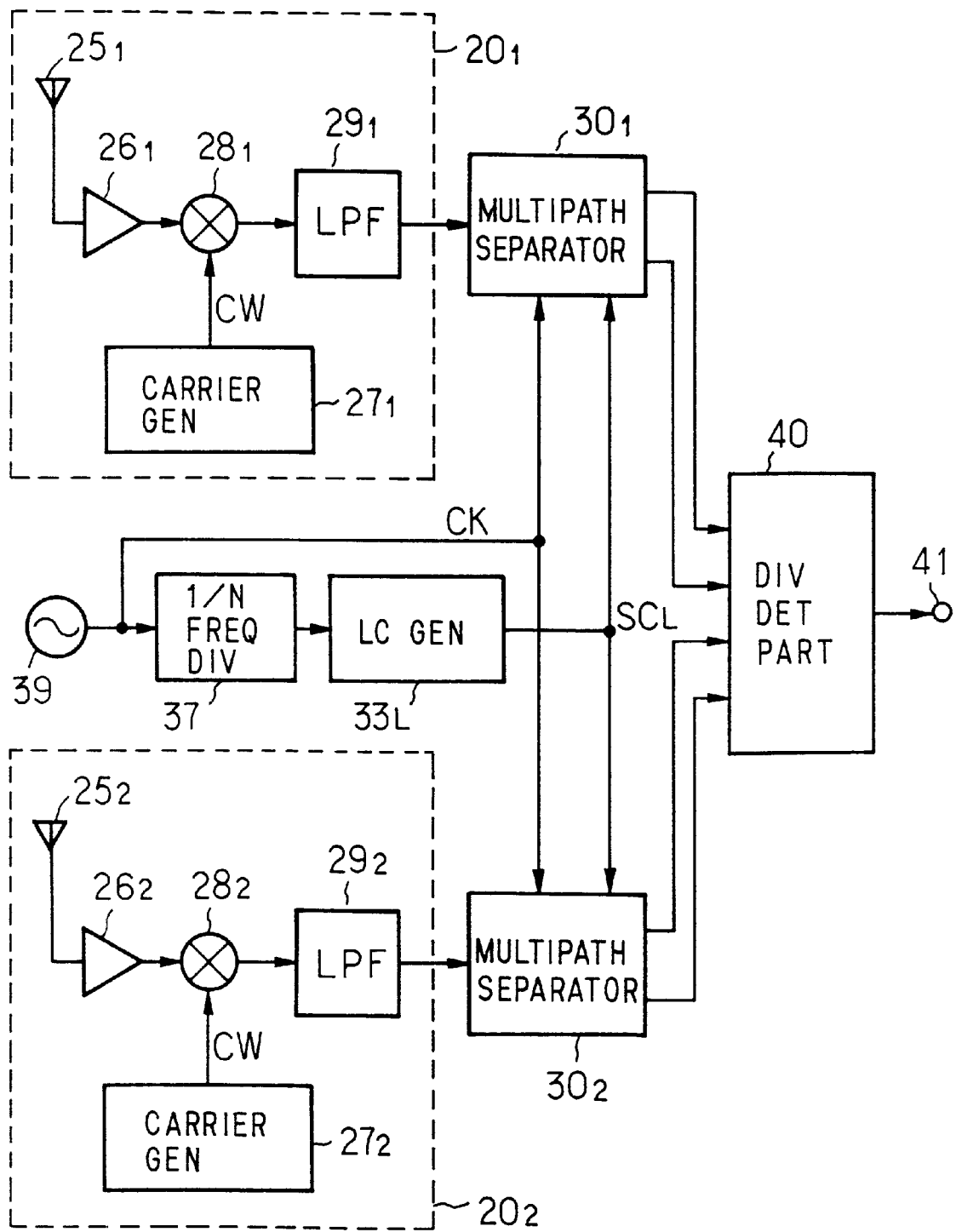
FIG. 16 is a block diagram illustrating an embodiment of the receiver of the present invention which employs space diversity.

The receivers of the embodiments shown in FIGS. 6, 13 and 15 perform diversity detection through utilization of the multipath propagation delay time difference. In FIG. 16 there is illustrated an embodiment of a receiver which permits reception further robust against fading by a combination of the multipath diversity with antenna diversity (space diversity). In this example, two antennas $25_1$ and $25_2$ are provided apart or in different directions, the received signals therefrom are amplified by amplifiers $26_1$ and $26_2$ and multiplied by carrier signals CW from carrier signal generators $27_1$ and $27_2$ in multipliers $28_1$ and $28_2$, then difference frequency components are extracted by low-pass filters $29_1$ and $29_2$ from the multiplied outputs and are fed as spread baseband received signals to the multipath separating parts $30_1$ and $30_2$. The multipath separating parts $30_1$ and $30_2$ can be constructed in the same manner as the multipath separating part 30 in the receiver of FIGS. 6, 13 or 15, for instance. In the case of using the multipath separating part of either one of the receivers depicted in FIGS. 6 and 13, since the long code generators $33_L$ of the two multipath separating parts $30_1$ and $30_2$ generate the same long code $SC_L$, it is also possible to employ a configuration wherein the multipath separating parts share one long code generator $33_L$ as shown in FIG. 16.

The despread baseband signals corresponding to the direct path and the delayed path, provided from the multipath separating parts $30_1$ and $30_2$, are fed to the diversity detecting part 40 for diversity detection. In this case, it is sufficient that the diversity detecting part 40 extends the configuration having the two terminals $3_1$ and $3_2$ and the adder 43D as shown in FIG. 10A, 10B or 10C into four paths versions. The interference canceler of FIG. 8 or 9 may be provided at the input of each path as depicted in FIG. 6. The signal decision result by the diversity detection is provided to the terminal 41.

Figure 17:
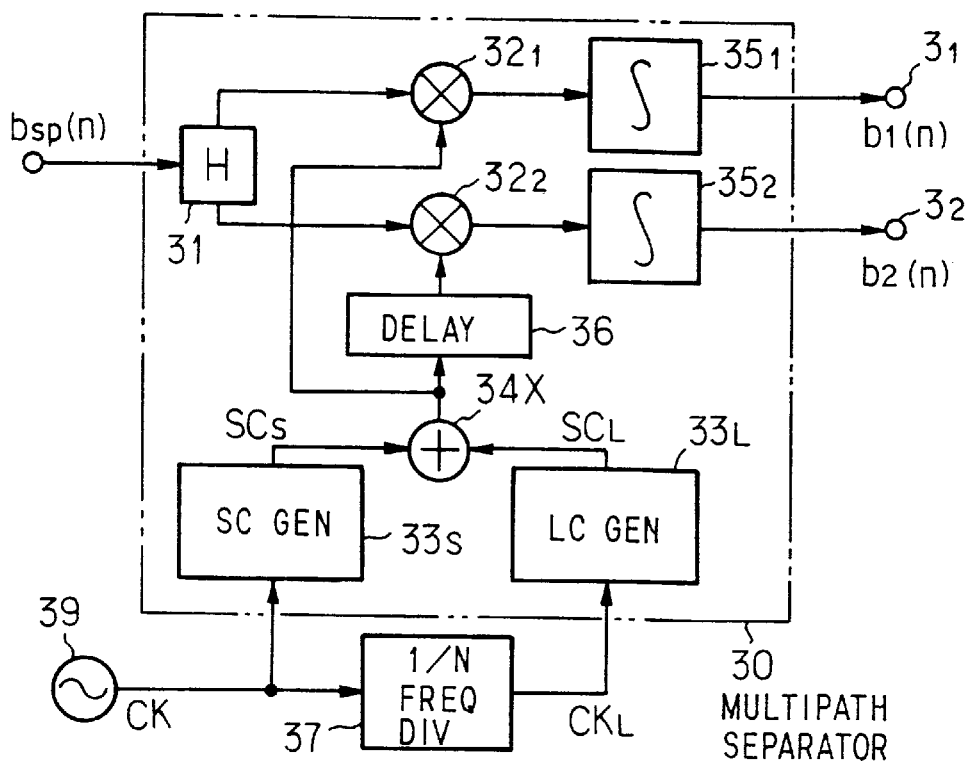
FIG. 17 is a block diagram showing another example of a multipath separating part in each embodiment of the receiver of the present invention.

In the receivers shown in FIGS. 6, 13 and 15, it is apparent that each multipath separating part 30 may have such a configuration as shown in FIG. 17. In this instance, the short code from the short code generator $33_S$ and the long code from the long code generator $33_L$ are combined by an exclusive-OR circuit 34X into a composite spreading code, which is fed to a despreading part $32_1$ formed by one multiplier, wherein the spread baseband received signal of the direct path is multiplied by the composite spreading signal, and the multiplied output is smoothed by an integrator $35_1$ to obtain a despread signal. At the same time, the composite spreading code is delayed by a delay circuit 36 for a predetermined delay time and applied to a despreading part $32_2$ formed by one multiplier, wherein the spread baseband received signal of the delayed path is multiplied by the delayed composite spreading code, and the multiplied output is smoothed by an integrator $35_2$ to obtain a despread signal. In the application of this configuration to the receiver of FIG. 15, however, the long code generator 33L is adapted to be used in common to the other multipath separating parts. With the configuration of FIG. 17, one of the delay circuits in FIGS. 1, 13 and 15 can be dispensed with and the two multipliers $32B_1$ and $32B_2$ can be substituted with one exclusive-OR circuit 34X. But the principle of operation in this example is exactly the same as that described above with reference to FIGS. 6, 13 and 15. Further, it is apparent that the spreading part 14 in each of the transmitters of FIGS. 4 and 11 can be formed by one multiplier and an exclusive-OR circuit as depicted in FIG. 17 so that the baseband modulated signal b(n) is multiplied by the exclusive OR of the short and long codes from the short and long code generators $13_S$ and $13_L$.

Figure 18:
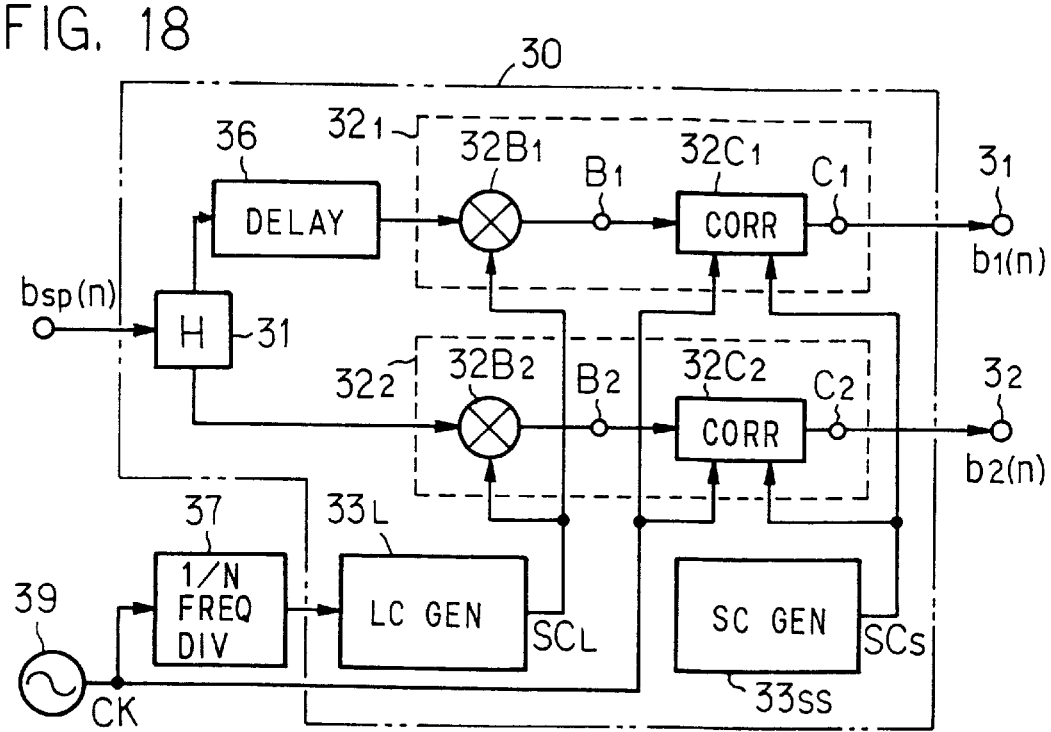
FIG. 18 is a block diagram showing the configuration of the multipath separating part for use in the case of employing a correlator for despreading by the short code in each embodiment of the receiver of the present invention.

In FIG. 18 there is illustrated another modified form of the multipath separating part 30 for use in the receivers depicted in FIGS. 6, 13 and 15, which is adapted to use correlators for despreading by the short code. As shown in FIG. 18, the delay circuit 36 is provided between the output of the hybrid circuit 31 and the input of the despreading part $32_1$ corresponding to the direct path. The despreading part $32_1$ corresponding to the direct path is composed of a multiplier $32B_1$ which multiplies the spread baseband received signal $b_{sp}(n)$ from the hybrid circuit 31 via the delay circuit 36 by the long code from the long code generator $33_L$ and a correlator $32C_1$ which correlates the multiplier output with the short code $SC_S$ and provides the correlated output as the despread baseband modulated signal $b_1(n)$ to the terminal 31. In the FIG. 18 embodiment, short codes $SC_S$ of the chip number M held in a short code setting part $33_{SS}$ are provided in parallel, as tap coefficients $w_1^*$ to $w_M^*$, to the respective correlators $32C_1$ and $32C_2$, instead of generating a sequence of chips of the short code $SC_S$ in a repeating cyclic order, and in the correlators $32C_1$ and $32C_2$ the short code $SC_S$ is correlated with the long code multiplied outputs from the multipliers $32B_1$ and $32B_2$, by which despreading is performed.

Figure 19:
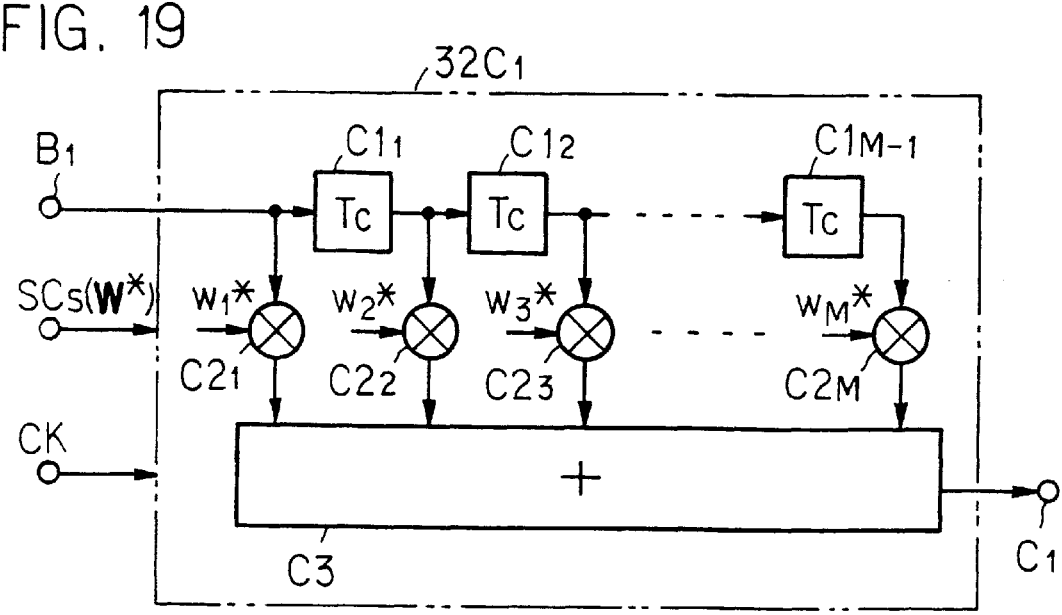
FIG. 19 is a block diagram showing an example of the configuration of each correlator used in FIG. 18.

The correlator $32C_1$ is formed by, for example a transversal filter as shown in FIG. 19. That is, the correlator $32C_1$ comprises: cascade-connected M-1 stages of delay elements $C1_1$ to $C1_{M-1}$ into which the multiplied output from the multiplier $32B_1$ is input; multipliers $C2_1$ to $C2_M$ which multiply the inputs to the respective delay elements $C1_1$ to $C1_{M-2}$ and the output from the last-stage delay element $C1_{m-1}$ by the tap coefficients $w_1^*$ to $w_M^*$, respectively, where * denotes complex conjugate; and an adder C3 which adds together the multiplied outputs from the multipliers $C2_1$ to $C2_M$ and provides the added output as a correlation value to a terminal $C_1$. The function of the adder C3 is equivalent to the function of the integrator $35_1$ in FIGS. 6, 13, 15 and 17. The delay time of each of the delay elements $C1_1$ to $C1_{M-1}$ is equal to the period $T_C$ of the clock signal CK (the chip period of the short code in the receiver shown in FIG. 4), and the correlator $32C_1$ operates in synchronization with the clock signal CK as a whole. The correlator $32C_2$ also as the same configuration as that of the correlator $32C_1$. By accurately setting the delay time to be set in the delay circuit 36 to the delay time of the delayed path relative to the direct path, the peak of the correlated output for the direct path from the correlator $32C_1$ and the peak of the correlated output for the delayed path from the correlator $32C_2$ coincide with each other in timing, and the correlated outputs of that timing are applied, as the baseband modulated signals $b_1(n)$ and $b_2(n)$ to be despread, to terminals $3_1$ and $3_2$.

Figure 20:
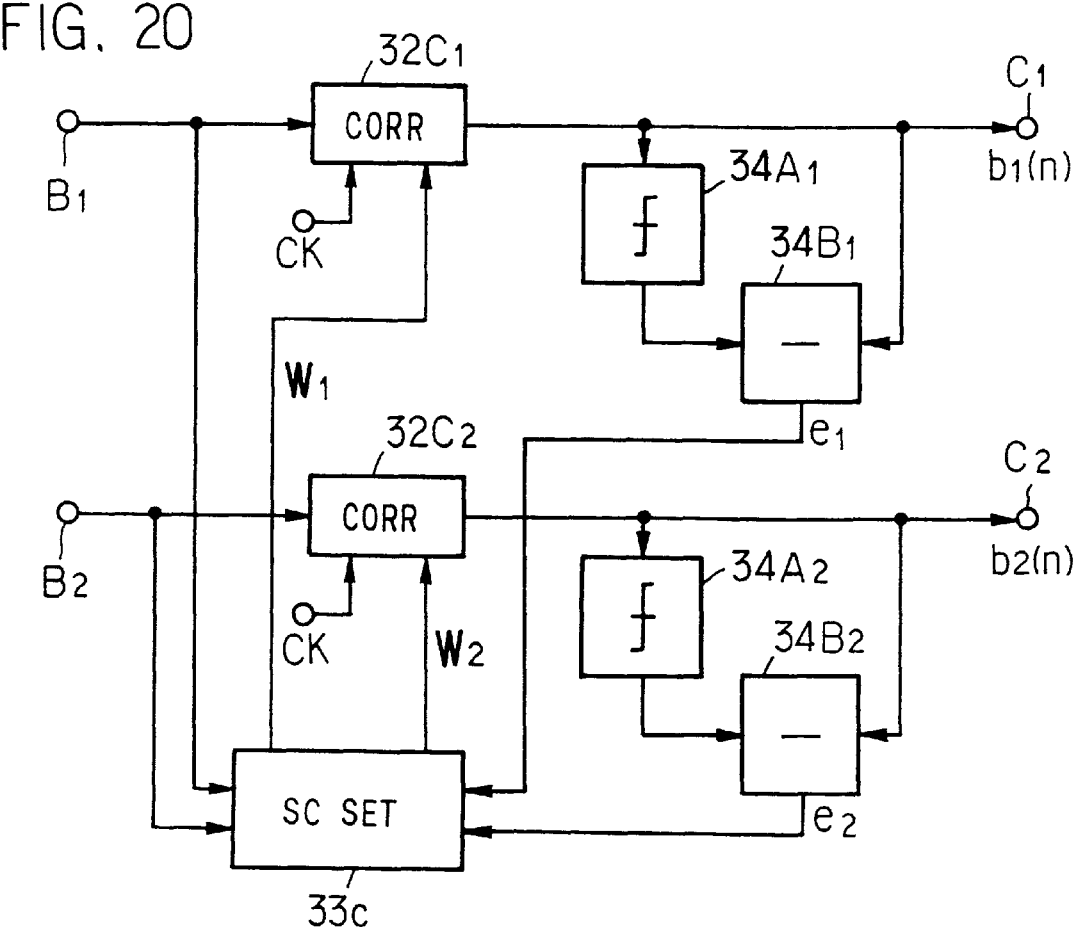
FIG. 20 is a block diagram showing an example of a configuration which performs interference cancellation in a despreading part in the FIG. 18 embodiment.

In the application of the multipath separating part 30 of FIG. 18 to the receivers of FIGS. 6, 13 and 15, the correlators $32C_1$ and $32C_2$ and the short code setting part $33_{SS}$ are provided instead of providing the interference cancelers $42_1$ and $42_2$ for canceling interference signals from other users in the diversity detecting part 40 as shown in FIG. 3. This configuration is illustrated in FIG. 20. The multipath separating part 30 of this example comprises: hard decision units $34A_1$ and $34A_2$ which make hard decision of the output signals from the correlators $32C_1$ and $32C_2$; subtractors $34B_1$ and $34B_2$ which output the differences between the decision results and the outputs from the correlators $32C_1$ and $32C_2$ as error signals $e_1$ and $e_2$; and a short code setting part $33_C$ which determines the short codes to be fed as tap coefficient vectors $W_1$ and $W_2$ to the correlators $32C_1$ and $32C_2$ on the basis of the error signals $e_1$ and $e_2$ and the long code multiplied results that are provided to terminals $B_1$ and $B_2$. The correlators $32C_1$ and $32C_2$ have the same construction as shown in FIG. 19 and driven by the clock signal CK of the period $T_C$. Elements $\{w_{11}^*, w_{12}^*, \ldots, W_{1M}^*\}$ and $\{w_{21}^*, w_{22}^*, \ldots, w_{2M}^*\}$, which form the given tap coefficient vectors $W_1$ and $W_2$, are provided as tap coefficients from the short code setting part $33_C$ to the correlators $32C_1$ and $32C_2$, respectively, from which the correlations between the tap coefficients and the long code multiplied outputs from the terminals $B_1$ and $B_2$ are output, as despread outputs by the short codes $SC_{S1}$ and $SC_{S2}$, to terminals $C_1$ and $C_2$.

In the short code setting part $33_C$ there are always held the same versions as the latest M long code multiplied results $x_{11}, x_{12}, \ldots, x_{1M}$ fed to the correlator $32C_1$ via the terminal $B_1$ in synchronization with the clock signal CK, and the short code $SC_S = \{s_1, s_2, \ldots, s_M\}$ consisting of M chips is provided as an initial value of the tap coefficient vector $W_1$ to the multipliers $C2_1, C2_2, \ldots, C2_M$ in the correlator $32C_1$ (see FIG. 19), iteratively correcting the tap coefficient vector $W_1 = \{w_{11}^*, w_{12}^*, \ldots, w_{1M}^*\}$ so that the mean square of the error signal $e_1$ from the subtractor $34B_1$ is minimized following the LMS algorithm that is a kind of least squares method. Similarly, the short code setting part $33_C$ is further being supplied with the same versions as the latest M long code multiplied results $x_{21}, x_{22}, \ldots, x_{2M}$ fed via the terminal $B_2$ in synchronization with the clock signal CK, and the short code $SC_S = \{s_1, s_2, \ldots, s_M\}$ is provided as an initial value of the tap coefficient vector $W_2$ to the correlator $32C_2$, iteratively correcting the tap coefficient vector $W_2 = \{w_{21}^*,$ $w_{22}^*, \ldots w_{2M}^*\}$ so that the mean square of the error signal $e_2$ from the subtractor $34B_2$ is minimized following the LMS algorithm. When the tap coefficient vectors $W_1$ and $W_2$ are thus controlled to minimize the mean squares of the error signals $e_1$ and $e_2$, the correlators $32C_1$ and $32C_2$ provide, as their outputs $b_1(n)$ and $b_2(n)$, despread baseband modulated signals with interference signals canceled therefrom.

Figure 21:
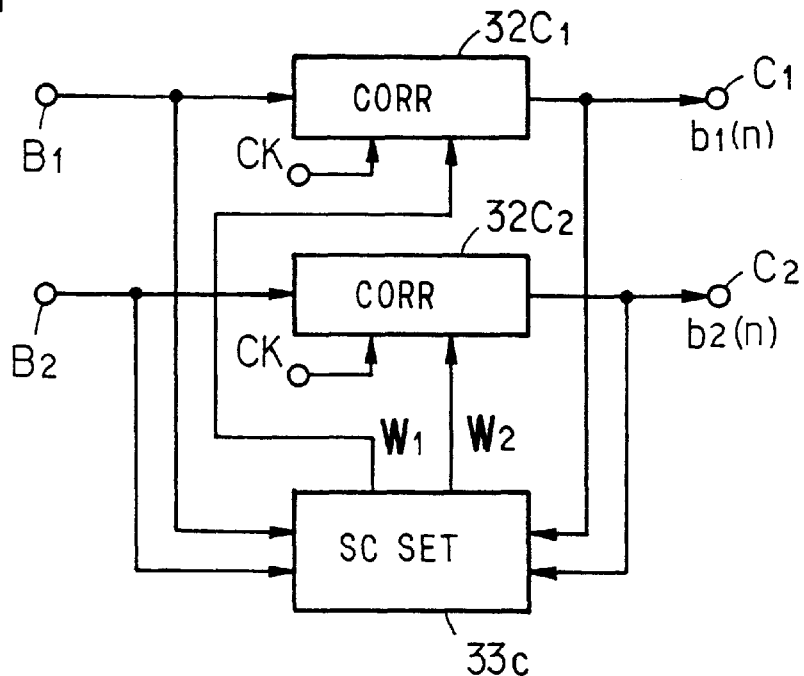
FIG. 21 is a block diagram showing another example of the configuration which performs interference cancellation in the despreading part in the FIG. 18 embodiment.

FIG. 21 illustrates in block form another embodiment which performs interference cancellation in the correlators $32C_1$ and $32C_2$. The illustrated configuration is a substitute for the correlators $32C_1$ and $32C_2$ and the short code setting part $33_{SS}$ in FIG. 18. In this example, the short code setting part $33_C$ determines the tap coefficient vectors $W_1$ and $W_2$ to be set in the correlators $32C_1$ and $32C_2$ on the basis of the latest M multiplied results $\{x_{11}, x_{12}, \ldots, x_{1M}\}$ and $\{x_{21}, x_{22}, \ldots, x_{2M}\}$ each equal in number to the chip number of the short code, the outputs from the correlators $32C_1$ and $32C_2$ and the short code $SC_S$. That is to say, as is the case with FIG. 20, the short code setting part $33_C$ is being supplied with the latest M long code multiplied results $\{x_{11}, x_{12}, \ldots, x_{1M}\}$ and controls the tap coefficient $\{w_{11}^*, w_{12}^*, \ldots, w_{1M}^*\}$ so that the average power of the output signal from the correlator $32C_1$ is minimized under a constraint that the inner product $W^T_1 S$ of the tap coefficient vector $W_1 = \{w_{11}^*, w_{12}^*, \ldots, w_{1M}^*\}$ and the short code $SC_S = \{s_1, s_2, \ldots, s_M\}$ as a steering vector S be constant. Here, $^T$ denotes transposition. As regards the correlator $32C_2$, too, the short code setting part $33_C$ similarly controls the tap coefficient so that the average power of the output signal from the correlator $32C_2$ is minimized under a constraint that the inner product $W^T_2 S$ of the tap coefficient vector $W_2 = \{w_{21}^*, w_{22}^*, \ldots w_{2M}^*\}$ and the short code be constant. Also with the arrangement shown in FIG. 21, the correlators $32C_1$ and $32C_2$ cancel interference signals on the basis of the tap coefficient vectors $W_1$ and $W_2$ determined as mentioned above and output, as despread baseband modulated signals $b_1(n)$ and $b_2(n)$, the correlations between the long code multiplied results corresponding to the direct and delayed paths and the short code $SC_S$.

Figure 22:
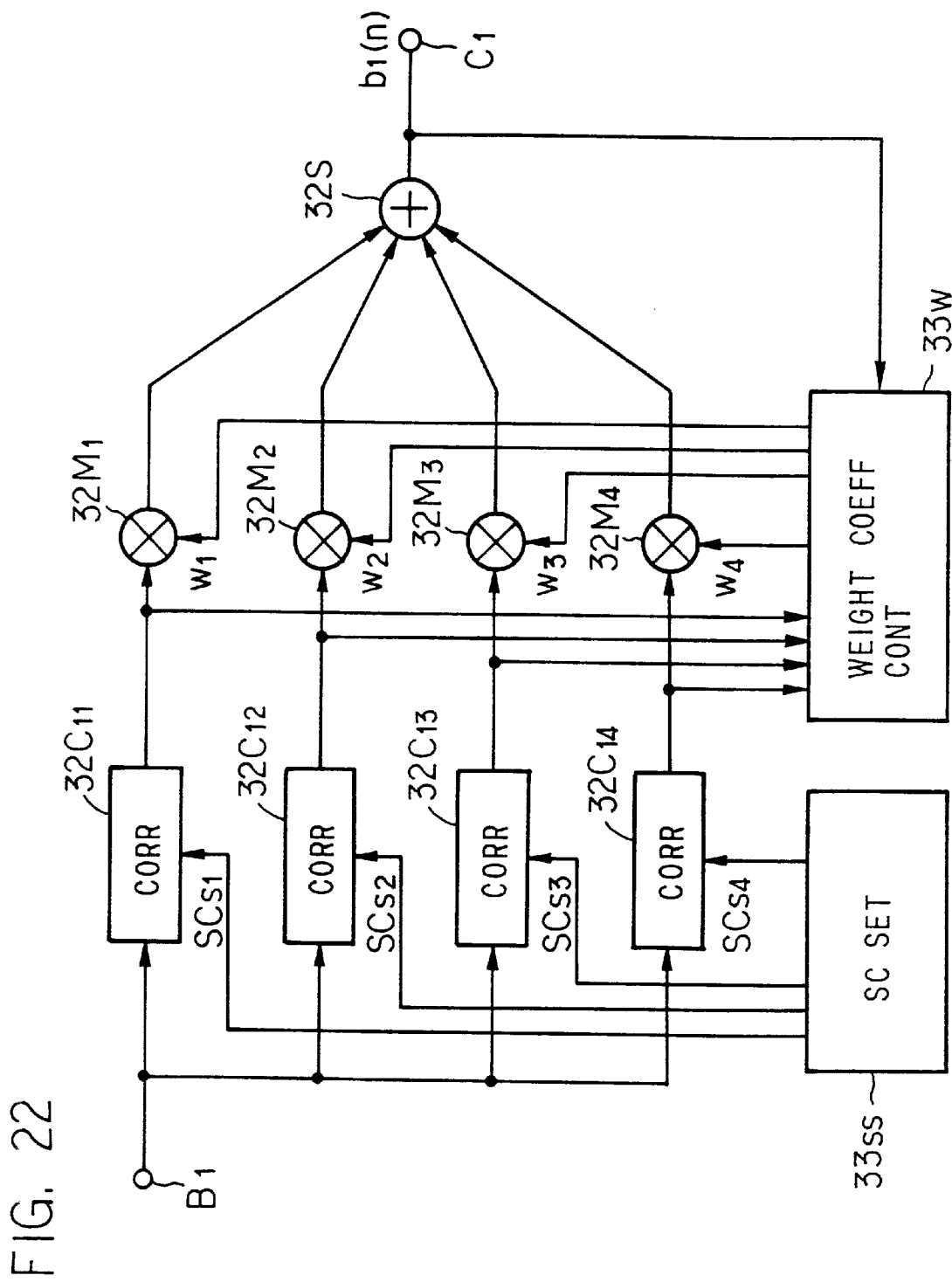
FIG. 22 is a block diagram showing still another example of the configuration which performs interference cancellation in the despreading part in the FIG. 18 embodiment.

While the modifications shown in FIGS. 20 and 21 both have been described to cancel interference signals in the correlators $32C_1$ and $32C_2$, it is also possible to employ, based on the same principle as that in FIG. 8 or 9, a configuration wherein a plurality of correlators are provided in the despreading part in such a manner as to cancel an interference signal from a linear composite signal of their correlation outputs. An example of such an arrangement is depicted in FIG. 22, in which only the configuration between the terminals $B_1$ and $C_1$ in one despreading part $32_1$ in FIG. 18, and the configuration of this example can be provided between the terminals $B_2$ and $C_2$ as well. Further, in the application of the principle in FIG. 8, connection lines from the outputs of correlators $32C_1 1$ to $32C_{14}$ and an adder $32_S$ to a weighting factor control part $33_W$ in FIG. 22 are unnecessary.

In the FIG. 22 embodiment, different short codes $SC_{S1}$ to $SC_{S4}$ of the same length are set in the correlators $32C_{11}$ and $32C_{14}$ from the short code setting part $33_{SS}$. One of the short codes is the short code $SC_{S1}$ for the desired signal, which is set in the correlator $32C_{11}$, for instance. For instance, in the case of employing the principle of FIG. 8, the other short codes $SC_{S2}$, $SC_{S3}$ and $SC_{S4}$ are set in the other correlators $32C_{12}$, $32C_{13}$ and $32C_{14}$, and the correlations between the long code multiplied results and the individual short codes $SC_{S1}$ to $SC_{S4}$ are obtained. The resulting correlation outputs are provided to multipliers $32M_1$ to $32M_4$, wherein they are multiplied by weighting factors $w_1$ to $w_4$ from the weighting factor control part $33_W$, then the multiplied outputs are added together by an adder 32S and the adder output is provided as the despread signal $b_1(n)$ to the terminal $C_1$. The multipliers $32M_1$ to $32M_4$ and the adder 32S constitute a weighting combiner. The weighting factor control part $33_W$ determines, as in the case of FIG. 8, the weighting factors $w_1$ to $w_4$ so that no interference signal other than the desired signal is contained in the linear composite signal that is produced by the adder 32S. In FIG. 22, the short codes $SC_{S2}$, $SC_{S3}$ and $SC_{S4}$ to be set in the correlators $32C_{12}$, $32C_{13}$ and $32C_{14}$ need not always be short codes of other users but may be those orthogonal to the short code $SC_{S1}$ and orthogonal to one another as previously in the FIG. 9 embodiment. The weighting factors $w_1$ to $w_4$ in such a case can be determined by the same operation as described previously with reference to FIG. 9.

In the receivers described above in respect of FIGS. 6, 13 and 16, one delay circuit 36 may be inserted between the hybrid circuit 31 and the despreading part 32, corresponding to the direct path as depicted in FIG. 18 instead of inserting the two delay circuits $36_S$ and $36_L$ of each multipath separating part 30 ($30_1$, $30_2$) between the short and long code generators $33_S$ and $33_L$ and the multipliers $32A_2$ and $32B_2$, respectively. Also in FIG. 17, the delay circuit 36 may be provided between the hybrid circuit 31H and the despreading part $32_1$. In the receivers of the embodiments shown in FIGS. 6, 13, 15, 16 and 17, the multipath separating parts 30, $30_1$ and $30_2$ have been described on the assumption that the received wave is based on a two-wave model. In the cases of a three-wave model, four-wave model and so forth, despreading branch paths corresponding to the number of delayed paths to be taken into account are added and despreading is carried out using short and long codes delayed by delay circuits of delay times corresponding to the respective delayed paths. And for multipath components further added by the above operation, it is necessary only to add arrangements corresponding to the paths in the diversity detector 43 (FIG. 10A, 10B or 10C) to permit diversity detection of the added multipath components.

As described above, the receiver of the present invention permits diversity type detection with improved SN ratio through maximum utilization of the energies of multipath components. As a result, the bit error rate can be improved. By using interference cancelers as required, signal components of other users in the same cell can also be canceled— this further improves the transmission characteristic. Additionally, the receiver can also be designed so that the spectral bandwidth of the transmission wave remains unchanged even if the transmission rate is changed.

Figure 23:
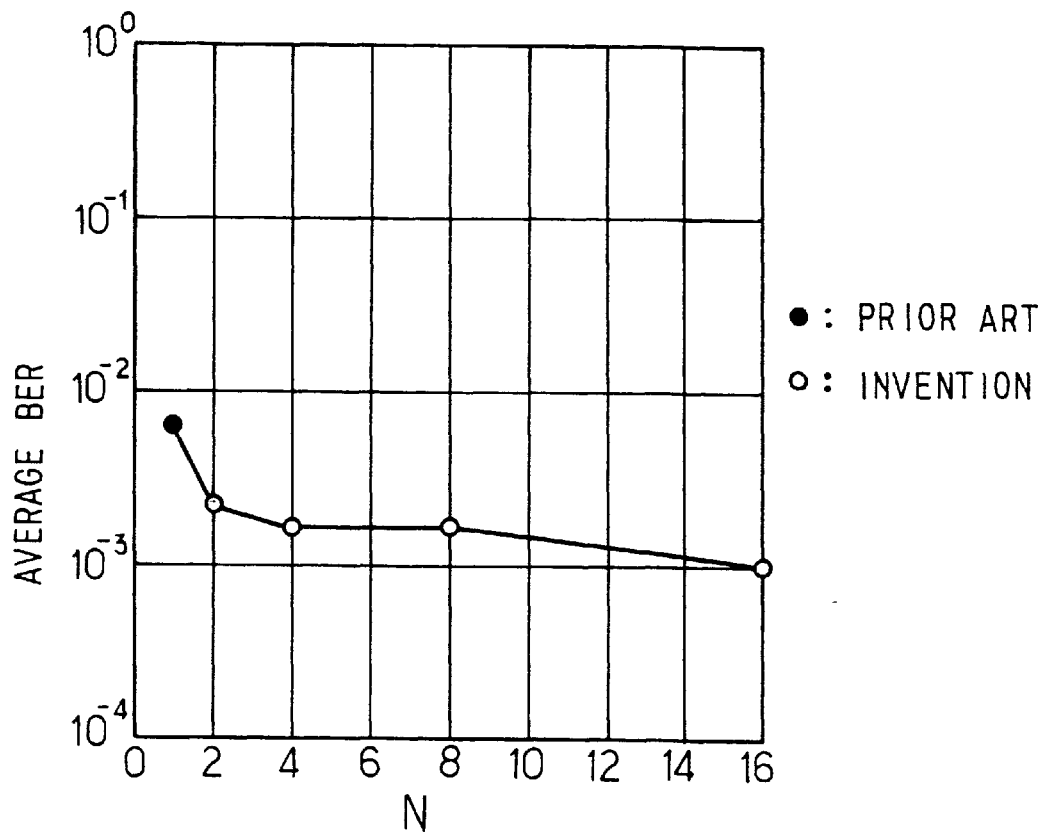
FIG. 23 is a graph showing average error rates in the prior art and in the present invention.

FIG. 23 shows computer simulation results which prove the effectiveness of the present invention. The spreading ratio was 16, the number of users was eight and the reception timing of the respective users was assumed to be synchronized. The modulation system used was a 10 Kb/s BPSK modulation system and codes of an auto-correlation below 0.25 were used as spreading codes. The propagation path model used was a two-path Rayleigh fading model and the delay time difference was $T_C$. The average En/No was 20 dB and the maximum Doppler frequency 80 Hz. In FIG. 22, N=1 shows the prior art and the average error rate is improved by the present invention which sets N to a value greater than 1. It is seen from FIG. 23 that the value N may preferably be 2, 3, 4 or so and that the improvement rate approaches saturation as the value N is further increased.

As described above, the present invention offers a spread spectrum transmitter and receiver which have excellent transmission characteristics over multipath propagation. Moreover, the channel capacity of the communication system can significantly be increased since interference components can effectively be canceled. The present invention is of great utility when employed in radio systems in which a large number of users share the same carrier frequency.

It will be apparent that many modifications and variations may be effected without departing from the scope of the novel concepts of the present invention.

What is claimed is:

1. A spread spectrum transmitter employing composite spreading codes, comprising:

a baseband modulating means for modulating an input digital signal of a predetermined bit rate into at least one baseband signal of a fixed symbol period;

clock signal generating means for generating a first clock signal of a predetermined first clock period and a second clock signal of a clock period N times longer than said first clock period, said N being a value larger than 1 but smaller than 8;

a short code generating means for repeatedly generating at least one short code of a chip period of the same length as that of said first clock period and of a first repetition period in synchronization with said first clock signal for each chip, said first repetition period of said short code being set equal to said symbol period;

a long code generator for repeatedly generating a long code having a chip period longer than the chip period of said short code and longer than a predetermined delay time of a propagation path and having a second repetition period in longer than said first repetition period, synchronization with said second clock signal for each chip, the number of chips of said long code being greater than that of said short code;

spreading means for spreading said baseband modulated signal by said at least one short code and said long code to generate a spread baseband modulated signal; and a transmitting part for modulating a carrier signal by said spread baseband modulated signal and for transmitting said modulated carrier signal.

2. The transmitter of claim 1, wherein said short code generating means includes selective code generating means for repeatedly generating a desired one of a plurality of short codes of predetermined different repetition periods in accordance with the transmission rate of said input digital signal, in synchronization with said first clock signal for each chip, and wherein said transmitter includes a select signal generator for supplying said selective code generating means of said short code generating means with a select signal to control it to select and generate a short code of a repetition period corresponding to the transmission rate of said input digital signal so that said repetition period of said short code and said symbol period of said baseband modulated signal coincide with each other.

3. The transmitter of claim 2, wherein said selective code generating means of said short code generating means includes a shift register driven by said first clock signal, a selective exclusive-OR circuit for selectively providing the exclusive ORs of different sets of shift stages of said shift register and a switch responsive to said select signal from said select signal generator to select and input one of said exclusive ORs of said different sets of shift stages to said shift register, said short code generating means outputting an input signal that is fed into a predetermined shift stage of said shift register as said short code.

4. The spread spectrum transmitter of claim 1 wherein said baseband modulating means includes:

a demultiplexer for distributing said input digital signal bit by bit to a designated number of signal sequences; and a plurality of baseband modulators for determining the number of said signal sequences in accordance with the transmission rate of said input digital signal so that each of said signal sequences always has another predetermined bit rate, and for modulating signal sequences of said another predetermined bit rates from said demultiplexer into baseband modulated signals of fixed symbol periods;

said short code generating means includes a plurality of short code generators for generating different short codes of the same repetition period in synchronization with said first clock signal for each chip; and said spreading means includes:

a plurality of first multipliers for spreading said baseband modulated signals from said plurality of baseband modulators by said short codes from said plurality of short code generators;

an adder for adding the outputs from said plurality of first multipliers into a primary spread baseband modulated signal; and a second multiplier for spreading said primary spread baseband modulated signal by said long code to obtain a secondary spread baseband modulated signal as said spread baseband modulated signal for modulating said carrier signal.

5. The transmitter of claim 2 or 4, wherein the transmission rate of said input digital signal is any one of a plurality of predetermined transmission rates that have an integral-multiple relationship to each other.

* * * * *